(12) United States Patent
Yoshida

(10) Patent No.: US 8,781,675 B2
(45) Date of Patent: Jul. 15, 2014

(54) ELECTRIC POWER TRANSMISSION RECEPTION SYSTEM

(75) Inventor: Ichiro Yoshida, Takahama (JP)

(73) Assignee: DENSO CORPORATION, Kariya (JP)

( * ) Notice: Subject to any disclaimer, the term of this patent is extended or adjusted under 35 U.S.C. 154(b) by 178 days.

(21) Appl. No.: 13/559,727

(22) Filed: Jul. 27, 2012

(65) Prior Publication Data

US 2013/0035823 A1 Feb. 7, 2013

(30) Foreign Application Priority Data

Aug. 2, 2011 (JP) .................................. 2011-169501

(51) Int. Cl.
| | | |
|---|---|---|
| *G01M 17/00* | (2006.01) | |
| *G07C 5/00* | (2006.01) | |
| *G07C 5/08* | (2006.01) | |
| *G07C 5/12* | (2006.01) | |
| *G01M 17/007* | (2006.01) | |

(52) U.S. Cl.
CPC .............. *G07C 5/008* (2013.01); *G07C 5/0808* (2013.01); *G07C 5/0841* (2013.01); *G07C 5/12* (2013.01); *G07C 5/085* (2013.01); *G01M 17/007* (2013.01)
USPC ........... 701/31.5; 701/22; 701/1; 180/65.285; 180/65.28

(58) Field of Classification Search
CPC .... G07C 5/008; G07C 5/0808; G07C 5/0841; G07C 5/12; G07C 5/085; G07C 2505/02; G01M 17/007
USPC ......... 701/22, 1, 111, 31.5, 84; 903/915, 909, 903/905; 180/65.265, 65.21, 65.235, 65.28; 318/490; 123/179.4; 475/254; 477/3
See application file for complete search history.

(56) References Cited

U.S. PATENT DOCUMENTS

| 7,207,304 | B2 * | 4/2007 | Iwatsuki et al. ........... 123/179.3 |
|---|---|---|---|
| 7,340,330 | B2 * | 3/2008 | Okoshi et al. .................. 701/22 |
| 7,352,188 | B2 * | 4/2008 | Kokubo ........................ 324/503 |
| 7,353,094 | B2 * | 4/2008 | Okoshi et al. .................. 701/22 |
| 7,357,204 | B2 * | 4/2008 | Hisada et al. ............ 180/65.285 |
| 8,219,304 | B2 * | 7/2012 | Soma ........................... 701/111 |

(Continued)

FOREIGN PATENT DOCUMENTS

| JP | A-H07-236204 | 9/1995 |
|---|---|---|
| JP | A-2001-215124 | 8/2001 |

(Continued)

OTHER PUBLICATIONS

Office Action mailed Jun. 4, 2013 in corresponding JP patent application No. 2011-169501 (and English translation).

*Primary Examiner* — Behrang Badii
(74) *Attorney, Agent, or Firm* — Posz Law Group, PLC

(57) ABSTRACT

A power transmission reception system for pairing a charge-requesting vehicle with a discharge-requesting vehicle for power transmission reception therebetween includes an extraction device and a transmitter. From each vehicle, a center acquire information about a present location, a traveling direction, and a destination point, and records the acquired information in a database while classifying the vehicle as the charge-requesting vehicle or the discharge-requesting vehicle. The extraction device extracts the charge-requesting vehicle and the discharge-requesting vehicle that are to simultaneously travel in a same area as paired vehicles in accordance with the information in the database. The transmitter generates information about a power transmission reception area and a partner vehicle in the power transmission reception, and transmits the generated information to the paired vehicles.

8 Claims, 18 Drawing Sheets

(56) References Cited

U.S. PATENT DOCUMENTS

| | | | |
|---|---|---|---|
| 2004/0249518 A1* | 12/2004 | Okoshi et al. | 701/1 |
| 2004/0249525 A1* | 12/2004 | Okoshi et al. | 701/22 |
| 2009/0266631 A1* | 10/2009 | Kikuchi | 180/65.265 |
| 2009/0315512 A1 | 12/2009 | Ichikawa et al. | |
| 2010/0004806 A1* | 1/2010 | Soma | 701/22 |
| 2010/0250042 A1* | 9/2010 | Shamoto | 701/22 |
| 2012/0053771 A1 | 3/2012 | Yoshida | |
| 2012/0109409 A1 | 5/2012 | Hara | |

FOREIGN PATENT DOCUMENTS

| | | |
|---|---|---|
| JP | A-2005-168085 | 6/2005 |
| JP | A-2005-210843 | 8/2005 |
| JP | A-2007-040711 | 2/2007 |
| JP | A-2011-094995 | 5/2011 |
| JP | A-2012-108870 | 6/2012 |
| JP | A-2012-157167 | 8/2012 |

* cited by examiner

FIG. 9

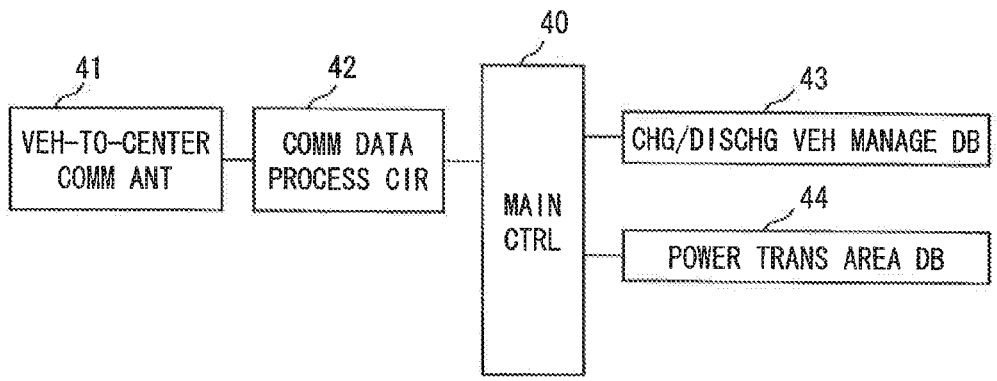

FIG. 10A

```
CHG-REQ VEH DB

· VEH ID
· POS INFO
· DEST (ROUTE)
· REQ-CHG AMT
· CHG-DEMANDING AREA
· CHG/DISCHG FUNC CLASS
· BAT CAPA: PRESENT CAPA
· USER CHARAC (RELIABILITY)
· VEH TYPE
· SIZE (LENGTH, HEIGHT)
· SAFETY FUNC PERF
· TRAVELING LOSS LIMIT 1.5
· TRAVEL STYLE
   FRONT, REAR, MIDWAY
   (THREE OR MORE VEH)
```

FIG. 10B

```
DISCHG-REQ VEH DB

· VEH ID
· POS INFO
· DEST (ROUTE)
· REQ-DISCHG AMT
· DISCHG-DEMANDING AREA
· CHG/DISCHG FUNC CLASS
· BAT CAPA: PRESENT CAPA
· USER CHARAC (RELIABILITY)
· VEH TYPE
· SIZE (LENGTH, HEIGHT)
· SAFETY FUNC PEFM
· TRAVELING LOSS LIMIT 1.2
· TRAVEL STYLE
   FRONT, REAR, MIDWAY
   (THREE OR MORE VEH)
```

ELECTRIC POWER TRANSMISSION RECEPTION SYSTEM

CROSS REFERENCE TO RELATED APPLICATION

The present application is based on and claims priority to Japanese Patent Application No. 2011-169501 filed on Aug. 2, 2011, disclosure of which is incorporated herein by reference.

TECHNICAL FIELD

The present disclosure relates to an electric power transmission reception system that can cause vehicles to communicate with an information center, pair a charge-requesting vehicle, which a vehicle having a charge request, with a discharge-requesting vehicle, which is a vehicle having a discharge request, and cause the paired charge-requesting vehicle and discharge-requesting vehicle to transmit or receive electric power.

BACKGROUND

In recent years, so-called electric vehicles, which are driven by electric power charged in a vehicle-mounted battery, are becoming widespread. The electric vehicles have unique difficulties such as electric power insufficiency during their travel and battery deterioration due to overcharging.

An electric power supply system disclosed in JP 2005-210843A enables an own vehicle to receive electric power supplied from the outside, such as a roadside power supply apparatus or another vehicle, via an electromagnetic wave or the like when the own vehicle has insufficient electric power, and enables the own vehicle to supply electric power to the outside of the own vehicle when it has extra electric power. More specifically, when, for instance, the amount of charge in a battery of the own vehicle is small, the electric power supply system causes a power supply apparatus mounted in the own vehicle to transmit an electric power request signal to a nearby roadside power supply apparatus or another vehicle. If, in such an instance, the own vehicle is near a roadside power supply apparatus or another vehicle capable of transmitting electric power, the roadside power supply apparatus or the other vehicle transmits electric power in response to the electric power request signal from the own vehicle. As a result, the own vehicle can receive the electric power transmitted from the roadside power supply apparatus or the other vehicle and increase the amount of charge in the battery.

An electric power supply system described in JP 2005-168085A includes a vehicle that transmits electric power, a vehicle that receives electric power, and an information management center that manages information exchanges with these vehicles. The information management center manages the information about individual vehicles. If multiple vehicles may transmit electric power and multiple vehicles may receive the electric power, the information management center selects an electric power-transmitting vehicle and an electric power-receiving vehicle under conditions that, for example, the relative distance between them is the shortest.

In the electric power supply system, when the amount of charge in its battery is small, the own vehicle transmits an electric power request signal. However, if vehicles within the reach of the electric power request signal cannot supply electric power, the own vehicle cannot receive electric power from another vehicle. In reality, it is difficult to always expect that the own vehicle, which is short of battery power, will timely encounter another vehicle capable of supply electric power.

Meanwhile, in the electric power supply system, the information management center merely selects the combination of an electric power-transmitting vehicle and an electric power-receiving vehicle under conditions that the relative distance between them is the shortest. Therefore, vehicles traveling in opposite directions may be selected as the electric power-transmitting vehicle and the electric power-receiving vehicle simply because they are presently located a short distance from each other. In such an instance, in order to transmit or receive electric power, at least one of the selected vehicles needs to significantly deviate from a route to its original destination.

SUMMARY

The present disclosure is made in view of the foregoing. It is an object of the present disclosure to provide an electric power transmission reception system that can pair a charge-requesting vehicle with insufficient electric power and a discharge-requesting vehicle with extra electric power, and can let them encounter each other to transmit or receive electric power without significantly deviating from a proper route.

According to one example, an electric power transmission reception system (i) enables vehicles to communicate with an information center, (ii) pairs a charge-requesting vehicle, which is one or ones of the vehicles that has a charge request, with a discharge-requesting vehicle, which is another one or ones of the vehicles that has a discharge request, and (iii) enables the paired charge-requesting vehicle and discharge-requesting vehicle to perform electric power transmission reception therebetween. The electric power transmission reception system includes a database, an extraction device and an information transmission device. The database that is provided in the information center, which communicates with each of the vehicles to acquire information about, a present location, a traveling direction, and a destination point of the each of the vehicles and information about whether the each of the vehicles has one of the charge request and the discharge request. The information center records the acquired information in the database while classifying the each of the vehicles as the charge-requesting vehicle or the discharge-requesting vehicle. The extraction device is provided in the information center to extract the charge-requesting vehicle and the discharge-requesting vehicle that are to travel in a same area at a same time as paired vehicles from the charge-requesting vehicle and the discharge-requesting vehicle recorded in the database in accordance with the information about the present location, the traveling direction, and the destination point of each of the vehicles. The information transmission device is provided in the information center to (i) generate information about an electric power transmission reception area, which is the area where the electric power transmission reception is to be performed, and information about a partner vehicle in the electric power transmission reception, and (ii) transmit the generated information to the charge-requesting vehicle and the discharge-requesting vehicle extracted by the extraction device as the paired vehicles.

The above electric power transmission reception system can pair a charge-requesting vehicle with insufficient electric power and a discharge-requesting vehicle with extra electric power, and can let them encounter each other to transmit or receive electric power without significantly deviating from a proper route.

BRIEF DESCRIPTION OF THE DRAWINGS

The above and other objects, features and advantages of the present disclosure will become more apparent from the following detailed description made with reference to the accompanying drawings. In the drawings:

FIG. 9 is a diagram illustrating a configuration of an information center;

FIGS. 10A and 10B are diagram respectively showing items of information to be recorded in a charge-requesting vehicle database and in a discharge-requesting vehicle database;

DETAILED DESCRIPTION

Figure 1:
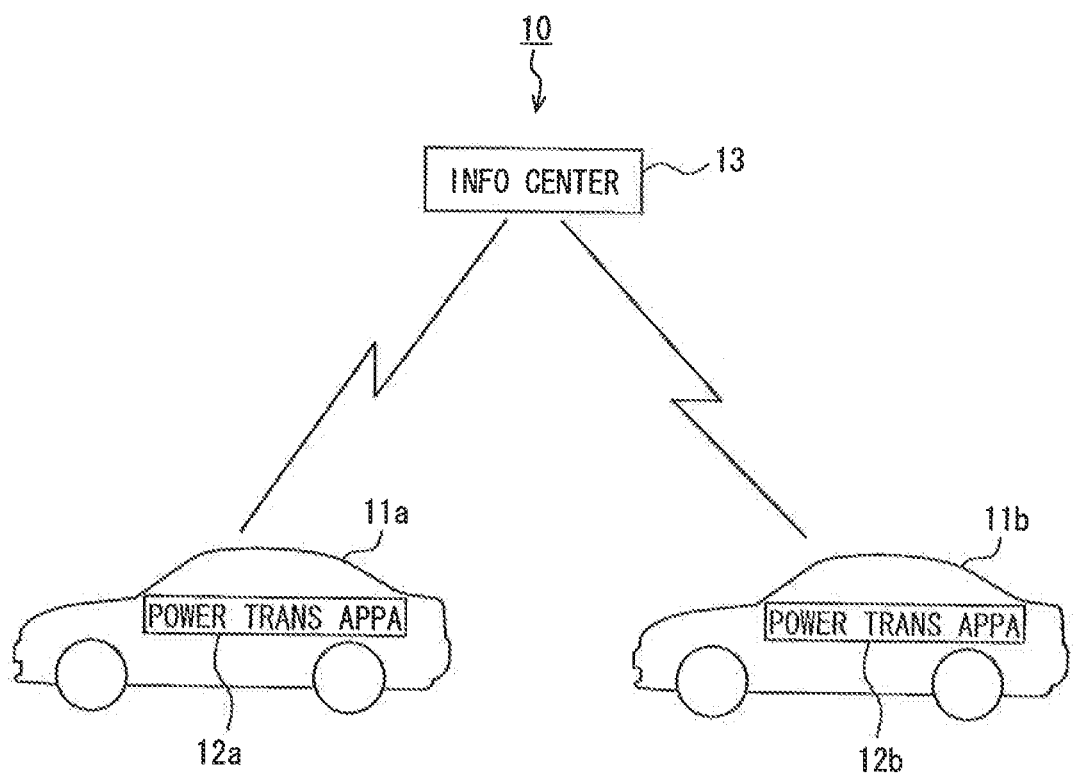
FIG. 1 is a schematic diagram illustrating an electric power transmission reception system of one embodiment.

An embodiment will now be described with reference to the accompanying drawings. FIG. 1 is a schematic diagram illustrating the overall configuration of an electric power transmission reception system 10 according to the present embodiment.

As shown in FIG. 1, the electric power transmission reception system 10 includes electric power transmission reception apparatuses 12 mounted in vehicles 11 (an electric power transmission reception apparatus 12a mounted in a vehicle 11a and an electric power transmission reception apparatus 12b mounted in a vehicle 11b) and an information center 13 capable of communicating with the electric power transmission reception apparatuses 12 through a wireless communication link.

Figure 2:
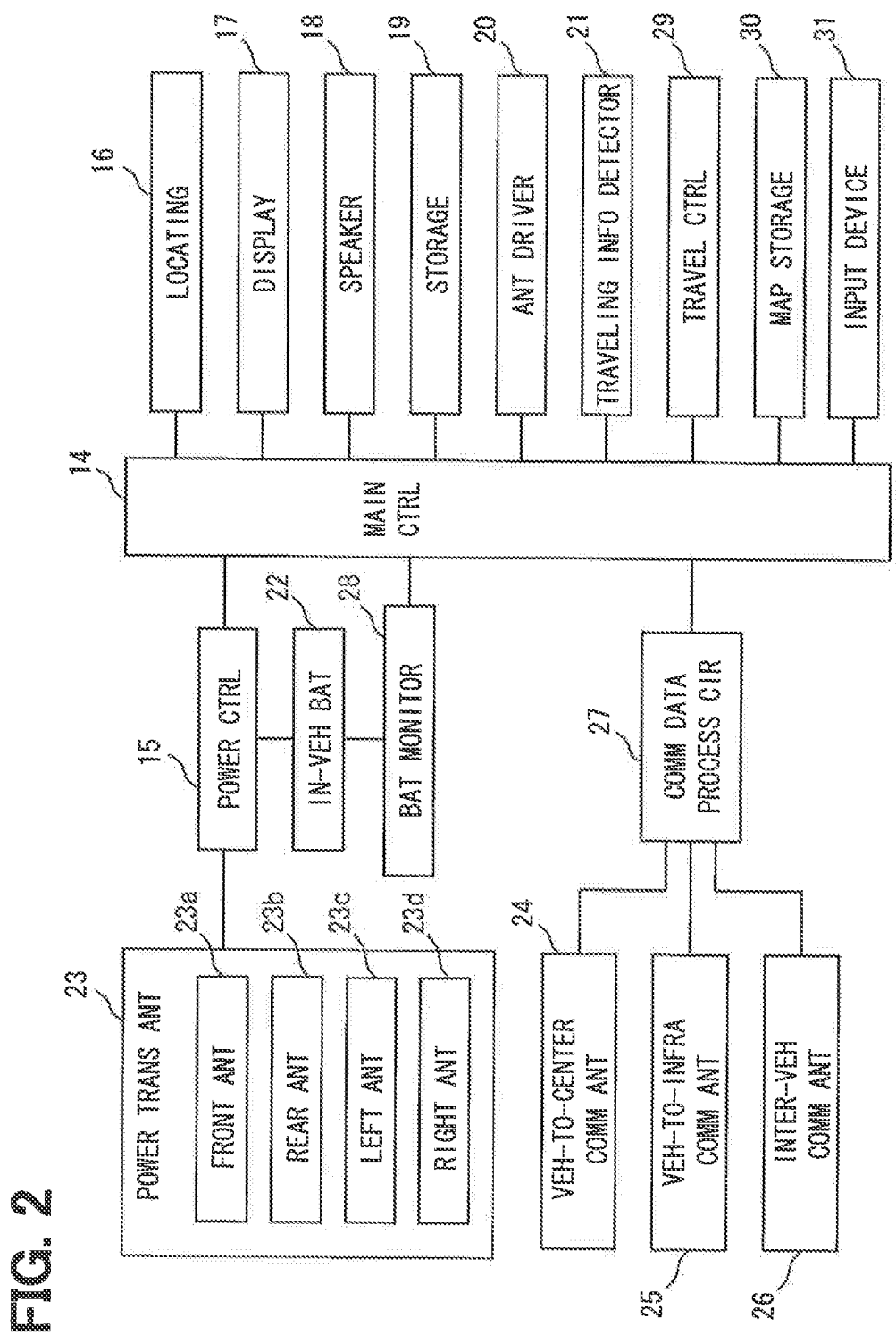
FIG. 2 is a diagram illustrating a configuration of an electric power transmission reception apparatus mounted in a vehicle.

First of all, the configuration of an electric power transmission reception apparatus 12 mounted in each vehicle 11 will be described with reference to FIG. 2. The configuration of the electric power transmission reception apparatus 12 does not vary from one vehicle 11 to another.

The electric power transmission reception apparatus 12 includes, for example, a main controller 14, an electric power control device 15, a positioning device 16, a display device 17, a vehicle-mounted loudspeaker 18, a storage device 19, an antenna drive device 20, a traveling information sensor 21, electric power transmission reception antennas 23, a vehicle-to-center information communication antenna 24, a vehicle-to-infrastructure information communication antenna 25, an inter-vehicle information communication antenna 26, a communication data processing circuit 27, a traveling control device 29, a map storage device 30, and an input device 31. The main controller 14 can be a core of the electric power transmission reception apparatus 12. The communication data processing circuit 27 processes data conveyed through the information communication antennas 24-26.

The main controller 14 includes a CPU (not shown) as its core and controls the overall operation of the electric power transmission reception apparatus 12. When, for instance, it is predicted that the vehicle-mounted battery 22 will need to be charged or discharged, the main controller 14 establishes information communication with the information center 13 and acquires information about a charge discharge target (infrastructure or vehicle) and about a charge discharge site. Further, the main controller 14 controls, for example, the traveling status of each vehicle 11 and the orientation of each electric power transmission reception antenna 23 so that each vehicle arrives at the charge discharge site to properly charge or discharge the vehicle-mounted battery 22.

The electric power control device 15 includes, for example, an electric power transmission reception processing circuit and an electric power conversion processing circuit. The electric power control device 15 changes electric power transmission reception processing circuit settings (e.g., circuit constant) and sets a resonant frequency as needed to comply with a frequency used for electric power transmission reception between a own vehicle 11*a* and a partner vehicle 11*b* that is to be achieved to charge or recharge the vehicle-mounted battery 22 through the later-described electric power transmission reception antennas 23. Further, the electric power control device 15 uses the electric power conversion processing circuit to convert electric power received from the outside to a voltage (magnitude and waveform) appropriate for charging the vehicle-mounted battery 22.

Furthermore, the electric power control device 15 uses a battery status monitoring device 28 to monitor the charge status of each cell in the vehicle-mounted battery 22 and exercises charge control over each cell. The charge balance of each cell is then properly adjusted to let the vehicle-mounted battery 22 operate in a stable manner. If, for instance, the charge balance or temperature of each cell is abnormal, the electric power control device 15 outputs abnormality information to the main controller 14.

Figure 3:
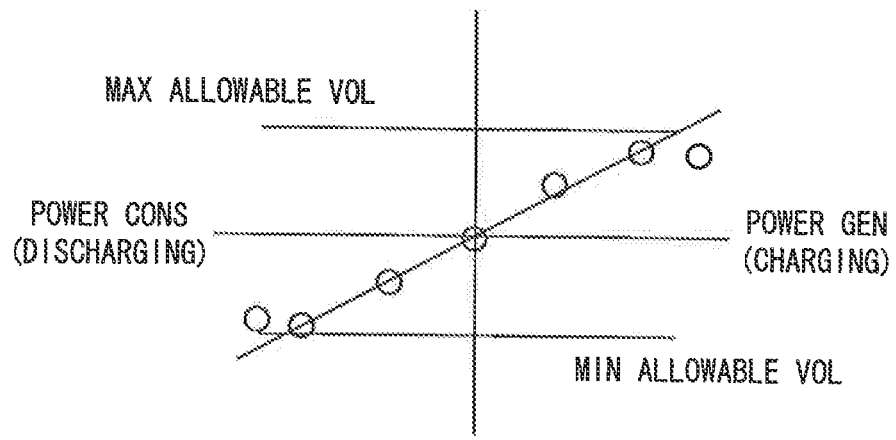
FIG. 3 is a diagram illustrating charge discharge characteristics of a vehicle-mounted battery.

The vehicle-mounted battery 22 has charge discharge characteristics (charge characteristics and discharge characteristics) shown, for instance, FIG. 3. More specifically, the vehicle-mounted battery 22 has a region (linear transition region) in which its voltage changes substantially linearly between a maximum voltage value allowable as a voltage value prevailing after a charge (maximum allowable voltage value Vmax in FIG. 3) and a minimum voltage value allowable as a voltage value prevailing after a discharge (minimum allowable voltage value Vmin in FIG. 3).

When the charge status of the vehicle-mounted battery 22 is about to exceed the maximum allowable voltage value Vmax, the electric power control device 15 performs a predetermined warning operation. More specifically, the electric power control device 15 stops charging the vehicle-mounted battery 22 and starts discharging the vehicle-mounted battery 22. In addition, the electric power control device 15 warns a driver of each vehicle 11 of the stop of charging and the start of discharging by causing the display device 17 to display relevant information and the vehicle-mounted loudspeaker 18 to generate a voice output.

Further, when the voltage of the vehicle-mounted battery 22 is about to drop below the minimum allowable voltage value Vmin, the electric power control device 15 also performs a predetermined warning operation. More specifically, the electric power control device 15 stops discharging the vehicle-mounted battery 22, and if possible, starts charging the vehicle-mounted battery 22 by making use of a regenerative operation of a motor. In addition, the electric power control device 15 warns the driver of the vehicle 11*a* of the stop of discharging and the start of charging by causing the display device 17 to display relevant information and the vehicle-mounted loudspeaker 18 to generate a voice output.

The positioning device 16 receives a satellite signal transmitted from a positioning satellite (e.g., a GPS satellite or GLONASS satellite) and calculates the present location and traveling direction of the own vehicle 11*a* from the satellite signal. In addition to or in place of the positioning device 16, which calculates the present location and traveling direction of the own vehicle 11*a* from the satellite signal, a positioning device designed to calculate the present location and traveling direction of the own vehicle 11*a* in accordance with values detected, for instance, by a speed sensor (not shown) and a gyro sensor (not shown) may be used.

The display device 17 includes, for example, a liquid-crystal display and displays various information in accordance with a display command signal input from the main controller 14. For example, the display device 17 displays a route to a destination that is set, or displays an energy balance curve indicative of battery voltage changes predicted from a charge discharge amount of the vehicle-mounted battery 22 that is required for traveling along the route. The display device 17 also displays the position of electric power transmission reception relative to the partner vehicle or infrastructure as well as the status of electric power transmission reception. Moreover, the display device 17 displays information helpful to a user such as the amount of remaining charge in the vehicle-mounted battery 22 and an available cruising distance.

The vehicle-mounted loudspeaker 18 is connected to the main controller 14 through a voice controller (not shown). In accordance with a voice output command signal output from the main controller 14, the vehicle-mounted loudspeaker 18 outputs various voice information. The storage device 19 includes, for example, a storage medium such as a memory or hard disk drive and stores various data and information.

The antenna drive device 20 changes the orientations of the coiled electric power transmission reception antennas 23 in an upward, downward, leftward, or rightward direction within a predetermined angular range. An LED or other luminescent device is disposed at the center of each of the electric power transmission reception antennas 23. From the center of each of the electric power transmission reception antennas 23, the luminescent device emits spot-shaped light in a direction in which each electric power transmission reception antenna 23 is oriented. This makes it easy to verify the orientation of each electric power transmission reception antenna 23 before and after it is changed by the antenna drive device 20.

The electric power transmission reception antennas 23 transmit electric power possessed by the own vehicle 11*a* (electric power stored in the vehicle-mounted battery 22 of the own vehicle 11*a*) to the partner vehicle 11*b* or enable the own vehicle 11*a* to receive electric power possessed by the partner vehicle 11*b* (electric power stored in the vehicle-mounted battery 22 of the partner vehicle 11*b*). As shown in FIG. 2, the electric power transmission reception antennas 23 include a front electric power transmission reception antenna 23*a* installed at the front of the own vehicle 11*a* (e.g., on the top of a front bumper), a rear electric power transmission reception antenna 23*b* installed at the rear (e.g., within a door of a rear trunk), a left-side electric power transmission reception antenna 23*c* installed at the left side (e.g., within a left side door), and a right-side electric power transmission reception antenna 23*d* installed at the right side (e.g., within a right side door). These electric power transmission reception antennas 23 transmit and receive electric power via electromagnetic waves by a resonance induction method.

Figure 4:
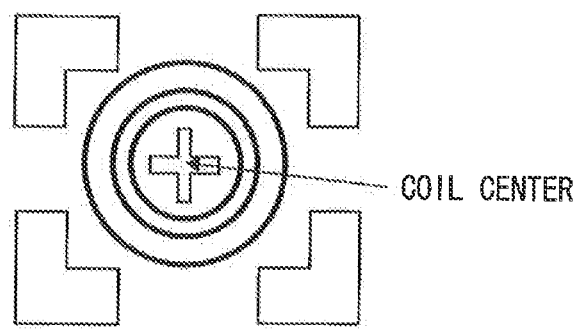
FIG. 4 is a diagram illustrating an exemplary marking indicating a central position and vertical and horizontal range of a coil, which is a part of an electric power transmission reception antenna.

As shown in FIG. 4, each of the electric power transmission reception antennas 23 is provided with a marking to indicate the central position and vertical and horizontal range of an included coil. To prevent, the appearance of the vehicle from being impaired, the marking can be produced by applying paint or surface treatment that is invisible to the human eye but detectable by infrared rays. However, the marking may be made visible from the outside to indicate that the vehicle is ready for wireless transmission reception of electric power. When such a marking is provided, antenna angle adjustments can be easily made to ensure that the electric power transmission reception antennas 23 of the own vehicle 11*a* face the electric power transmission reception antennas 23 of the partner vehicle 11*b*.

The electric power transmission reception antennas 23 are used not only to achieve electric power transmission reception between vehicles, but also to provide electric power transmission reception relative to roadside electric power transmission reception equipment (not shown) installed at various sites. In other words, the electric power transmission reception apparatus 12 can not only achieve electric power transmission reception relative to a partner vehicle, but also provide electric power transmission reception relative to an electric power transmission reception apparatus installed at various sites as an infrastructure.

The vehicle-to-center information communication antenna 24 is used for the transmission and reception of various information between each vehicle 11 and the information center 13. The vehicle-to-infrastructure information communication antenna 25 is used to transmit and receive information that is necessary when each vehicle 11 transmits electric power to or receives electric power from the electric power transmission reception apparatus installed as an infrastructure.

The inter-vehicle information communication antenna 26 is used for wireless transmission and reception of various information between each vehicle 11. The information transmitted or received by the inter-vehicle information communication antenna 26 includes, for example, a vehicle ID preset for each vehicle 11, the information about the present location of each vehicle 11, the image of the partner vehicle, a plate number, the information about the electric power transmission reception antennas 23, a discharge request signal for requesting the supply (discharge) of electric power to the partner vehicle, and a charge request signal for requesting the supply (charge) of electric power from the partner vehicle. The information about the electric power transmission reception antennas 23 includes, for example, the size, resistance value, and impedance of the coil included in each electric power transmission reception antenna 23 and the amount of electric power that can be transmitted and received (allowable output value).

It may be preferred that the inter-vehicle information communication antenna 26 provide, for example, DSRC (Dedicated Short Range Communications) or other short-range wireless communications because they are not likely to incur interference and other communication difficulties. Further, when the communications provided by the inter-vehicle information communication antenna 26 are established by using highly directive electric waves and light, interference and other communication difficulties are not likely to arise.

The communication data processing circuit 27 demodulates information received by the information communication antennas 24-26 to data recognizable by the main controller 14 or superimposes information on a carrier wave and modulates it when the own vehicle 11a transmits the information to the outside.

The traveling information sensor 21 includes various sensors (not shown), such as an acceleration sensor, a speed sensor, a steering sensor, a radar sensor, and a camera, and inputs various information detected by these sensors into the main controller 14 as traveling information indicative of the traveling status of a vehicle.

For example, the traveling information sensor 21 uses the radar sensor or the camera to detect a position relative to the partner vehicle (the distance to the partner vehicle, the deviation in the direction of vehicle width, etc.). If the detected relative position is deviated from the proper relative position for electric power transmission reception when electric power transmission reception is to be achieved relative to the partner vehicle while the vehicles are traveling in a row, the main controller 14 instructs the traveling control device 29 to correct the distance to the partner vehicle and the deviation in the direction of vehicle width. The traveling control device 29 includes a vehicle speed control device and a steering control device. In compliance with the instructions from the main controller 14, the vehicle speed control device and the steering control device control the distance to the partner vehicle and the deviation in the direction of vehicle width. The camera in the traveling information sensor 21 is also used to detect the position of the marking on each electric power transmission reception antenna 23 of the partner vehicle 11b and control the angles of the electric power transmission reception antennas 23 of the own vehicle 11a and of the partner vehicle 11b until they accurately face each other.

Further, in accordance with the information detected by the acceleration sensor and speed sensor included in the traveling information sensor 21 and with map data stored in the later-described map storage device 30, the main controller 14 checks during electric power transmission reception whether each vehicle 11 is performing an electric power transmission reception operation as scheduled while traveling at a specified speed in an electric power transmission reception area (road section) where electric power is transmitted/received. It should be noted that the information center 13 specifies the speed at which the vehicles travel in the road section for electric power transmission reception and the schedule of charging/discharging in the road section. If an actual charge discharge operation is deviated from the specified schedule, the main controller 14 instructs, for example, the traveling control device 29 to adjust the traveling speed and inter-vehicle distance and the antenna drive device 20 to adjust the orientations of the electric power transmission reception antennas 23 for the purpose of correcting such a deviation. The electric power transmission reception area (road section) will be described in detail later.

The map storage device 30 includes a storage medium on which road map data is stored. The road map data includes information about the shapes and joints of roads, information about the altitude and inclination of each road, and information about sites prone to traffic congestion and their time zones. However, the information about sites prone to traffic congestion and their time zones may be acquired by communicating with a traffic information center (not shown) each time a suggested route is to be set. Further, it may be preferred that the road map data include information about the road surface friction coefficient of each road.

The input device 31 is used by the driver of each vehicle to input a departure point, a destination point, and a transit point as well as a schedule of loading/unloading of luggage and passengers at each of such points. Further, upon receipt of a notification of conditions for an electric power transmission reception operation, such as the partner vehicle, site, and fee, from the information center 13, the input device 31 is also used to answer the information center 13 to specify whether or not to perform the electric power transmission reception operation or request the information center 13 to change the electric power transmission reception conditions.

When the destination point is input by the driver, the main controller 14 searches for a route to the destination point in accordance with the road map data stored in the map storage device 30 and displays the route on the display device 17. In such an instance, the main controller 14 divides the route to the destination point into some sections and calculates the charge discharge amount of the vehicle-mounted battery 22 in each section in accordance, for instance, with changes in the vehicle's potential energy due to altitude changes along each road. In this instance, when weight changes caused by the loading/unloading of luggage and passengers and traveling resistance changes based on the road surface friction coefficient are taken into account as shown in FIG. 5, the charge discharge amount can be calculated with increased accuracy.

Figure 5:
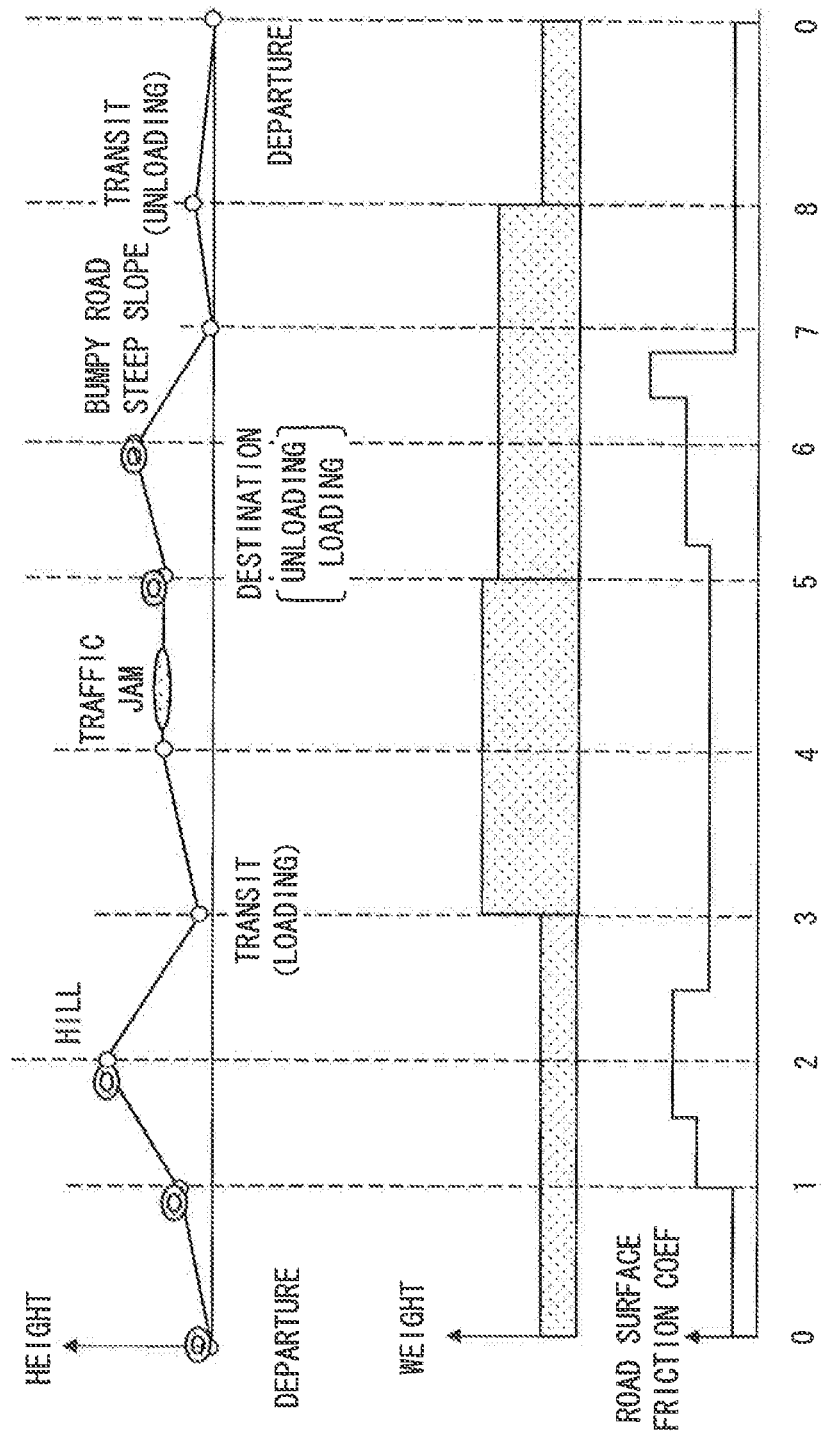
FIG. 5 is a diagram illustrating a vehicle potential energy change due to altitude changes along roads, a vehicle weight change due to luggage or passenger loading and unloading, and a change in traveling resistance due to a road surface friction coefficient change in individual sections of a planned travel route of the vehicle, the changes being used to calculate the charge and discharge amounts of the vehicle-mounted battery in the individual sections.

FIG. 5 shows an example of a route in which a vehicle departs from a departure point, arrives at a destination point, and returns to the departure point. In this example, the weight of the vehicle is increased at point 3 at which luggage is loaded into the vehicle, and slightly decreased at point 5 at which the loaded luggage is unloaded from the vehicle with new luggage loaded into the vehicle. Further, at point 8, the weight of the vehicle is decreased to its initial weight because the luggage loaded at point 5 is unloaded. FIG. 5 also shows changes in the road surface friction coefficient in various sections. However, the road surface friction coefficient significantly varies with weather (rain, snow, etc.). Therefore, it may be preferred that the road surface friction coefficient included in the road map data be corrected in accordance with weather information about the route, which can be acquired, for instance, from an external traffic information center. As regards the road surface friction coefficient, a traffic information center (not shown) may collect data indicative of the road surface friction coefficient from vehicles actually traveling on various roads, manage the collected data in an integrated fashion, and let the vehicles acquire road surface friction coefficient data about individual roads included in a route to a destination point when the vehicles search for such a route.

Further, when, for instance, aerodynamic energy consumed due to air resistance exhibited during a vehicle travel, nighttime lighting energy, energy for driving a vehicle-mounted air conditioner, and energy for operating a windshield wiper during a rain fall are taken into account, the charge discharge amount can be calculated with increased accuracy. Therefore, it may be preferred to acquire information about a wind direction and wind velocity to calculate the aerodynamic energy consumed in each section, examine the vehicle's traveling time zone in each section of a route to determine whether the lighting energy is required, predict the energy required for driving the vehicle-mounted air conditioner in accordance, for instance, with the operating status of the vehicle-mounted air conditioner and with the temperature and humidity of outside air, and predict the energy required for operating the windshield wiper and other apparatuses in accordance with weather information.

Next, the main controller 14 predicts changes in the charge discharge amount with reference to the present amount of charge in the vehicle-mounted battery 22 while considering electric power consumption and generation in each section, and causes the display device 17 to display an energy balance curve indicative of the changes in the charge discharge amount. An alternative configuration may be employed to notify the information center 13 of a departure point (present location) and a destination point, and let the information center 13 calculate a route to the destination point and the energy balance curve and supply the result of calculation to each vehicle 11.

Figure 6:
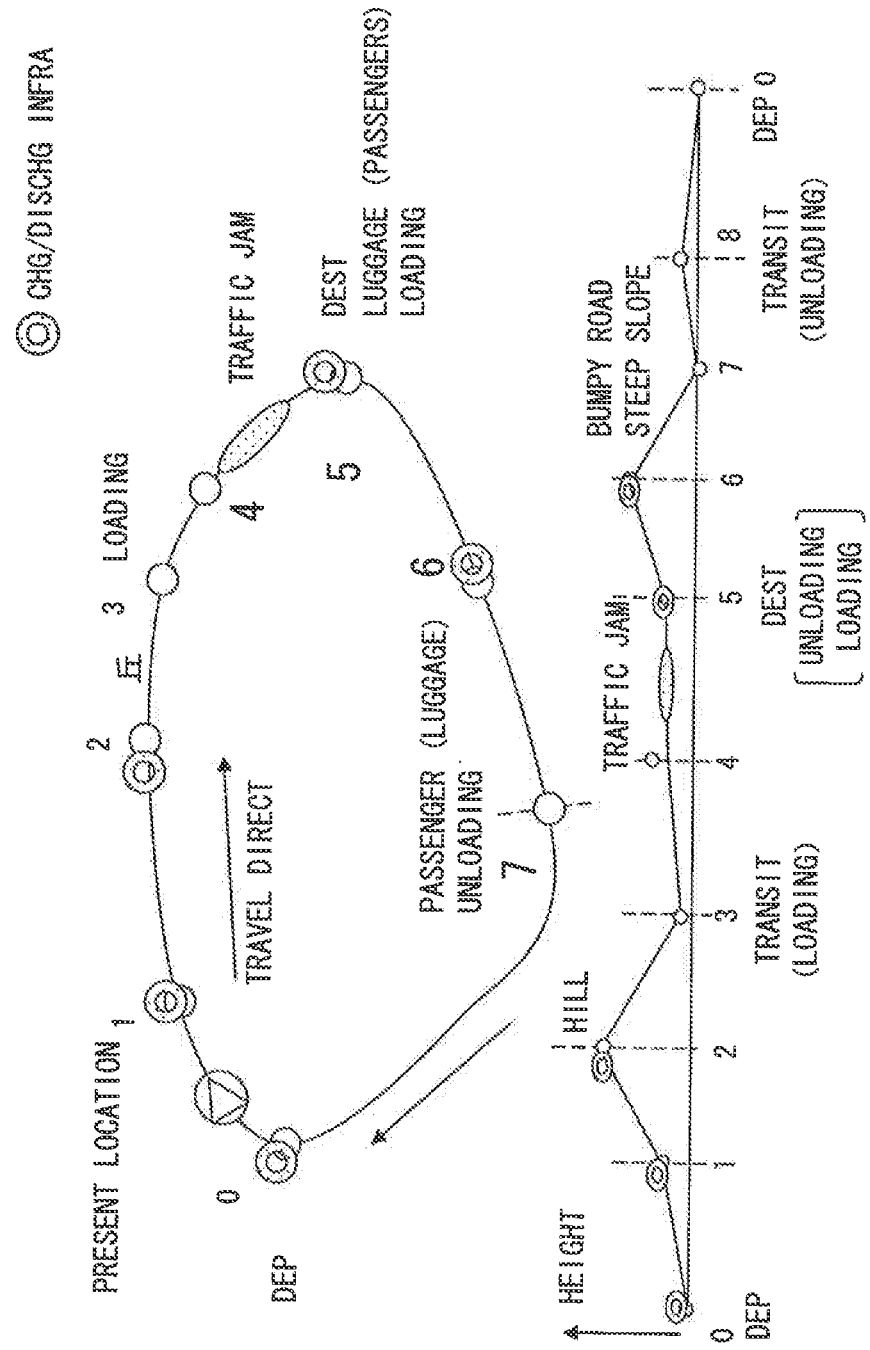
FIG. 6 is a diagram for explaining a manner of estimating consumption and generation of electric power (energy) in the individual sections in a situation where a vehicle travels along a planned route on which luggage or passenger is loaded/unloaded at preselected transit point and destination.

The example shown in FIG. 6 will now be used to describe in detail a method of estimating the consumption and generation of electric power (energy) in individual sections in a situation where a vehicle 11 travels along a planned route along which luggage and passengers are loaded or unloaded at preselected transit points and destination point. For ease of explanation, the following description deals with the amounts of electric power consumption and generation while taking particular note of only the height difference between roads in the individual sections and changes in the weight of the vehicle.

Figure 7:
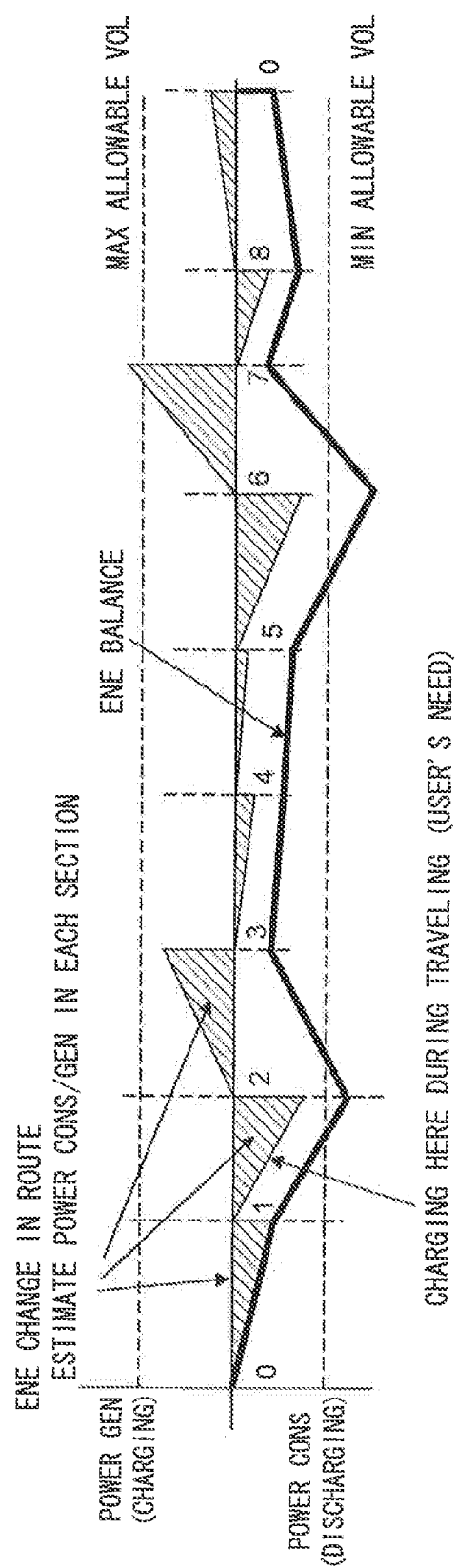
FIG. 7 is a diagram illustrating an energy balance curve indicative of overall battery voltage changes resulting from the consumption and generation of electric power in the individual sections in cases where the vehicle travels along the route shown in FIG. 6 without transmitting or receiving electric power to or from the outside of the vehicle.

As shown in FIG. 6, when the vehicle departs from a house or a sales office and travels in a section between point 0, which is a departure point, and point 1, electric power (energy) stored in the vehicle-mounted battery 22 is gradually consumed as shown in FIG. 7 because this section is a gradual ascent (see a hatched portion corresponding to the section between points 0 and 1; the same hereinafter).

Next, when the vehicle travels in a section between point 1 and point 2, the electric power stored in the vehicle-mounted battery 22 is consumed slightly rapidly (at least more rapidly than in the section between points 0 and 1) as shown in FIG. 7 because this section is a slightly steep ascent (e.g., an upward slope of a hill having a more gradual slope than a mountain).

Next, when the vehicle travels in a section between point 2 and point 3, electric power (energy equivalent, for instance, to potential energy stored in the vehicle before point 2 and regenerative energy generated when the vehicle is braked) is stored in the vehicle-mounted battery 22 slightly rapidly as shown in FIG. 7 because this section is a slightly steep descent (e.g., a downward slope of a hill having a more gradual slope than a mountain).

When the vehicle arrives at point 3, its weight changes (increases) because of the loading of luggage or passengers. Subsequently, when the vehicle travels in a section between point 3 and point 4, the electric power stored in the vehicle-mounted battery 22 is slightly consumed as shown in FIG. 7 because this section is a gradual ascent. In this section, the amount of consumption of electric power stored in the vehicle-mounted battery 22 is increased by the amount of the vehicle weight increase at point 3.

Next, when the vehicle travels in a section between point 4 and point 5, the electric power stored in the vehicle-mounted battery 22 is slightly consumed because this section is substantially flat. In this section, however, traffic congestion frequently occurs. Therefore, the amount of electric power consumption is estimated in consideration of traffic congestion (a situation where the vehicle is repeatedly stopped and accelerated). The increase in the vehicle weight, which is attributable to the luggage loaded at point 3, is also taken into consideration.

When the vehicle arrives at point 5, the luggage loaded at point 3 is unloaded and new luggage is loaded (or passengers are loaded). Subsequently, when the vehicle travels in a section between point 5 and point 6, the electric power stored in the vehicle-mounted battery 22 is rapidly consumed (at least more rapidly than in the section between points 1 and 2) as shown in FIG. 7 because the section between points 5 and 6 is a steep ascent (e.g., an upward slope of a mountain having a steeper slope than a mountain) as shown in FIG. 6. In this instance, the amount of electric power consumption is increased by the amount of weight increase caused by the luggage loaded at point 5.

Next, when the vehicle travels in a section between point 6 and point 7, electric power (energy based, for instance, on potential energy stored in the vehicle before point 6 and regenerative energy generated when the vehicle is braked) is stored in the vehicle-mounted battery 22 rapidly as shown in FIG. 7 because this section is a steep descent. The energy stored in this instance is increased because the potential energy of the vehicle is increased by the amount of weight increase caused by the luggage loaded at point 5.

Next, when the vehicle travels in a section between point 7 and point 8, the electric power stored in the vehicle-mounted battery 22 is slowly consumed as shown in FIG. 7 because this section is a gradual ascent. In this instance, the increase in the vehicle weight, which is attributable to the luggage loaded at point 5, is taken into consideration.

Next, when the vehicle arrives at point 8, the luggage loaded at point 5 is unloaded. The weight of the vehicle is then substantially decreased to the initial weight. Subsequently, when the vehicle travels in a section between point 8 and point 0, electric power is gradually stored in the vehicle-mounted battery 22 as shown in FIG. 7 because this section is a gradual descent. In this section, the amount of charge in the vehicle-mounted battery 22 is gradually increased because the weight of the vehicle is decreased at point 8.

When a planned route for a vehicle is divided into multiple sections to estimate the amount of electric power consumption and/or the amount of electric power generation in each section as described above, it is possible to locate sections in which the amount of electric power consumption is increased and sections in which the amount of electric power generation is increased. Further, when the amounts of electric power consumption and generation in the individual sections are integrated, it is possible to determine an energy balance that prevails when a vehicle departs from a departure point (point 0) and returns to the departure point through transit points and destination point. The energy balance is depicted by an energy balance curve shown in FIG. 7.

The energy balance curve shown in FIG. 7 indicates that the amount of charge in the vehicle-mounted battery 22 (charge amount) decreases below the minimum allowable voltage value in the section between points 1 and 2 and in the section between points 5 and 6 if no electric power transmission reception operation is performed. Conversely, it is relatively obvious that electric power is more than adequate in the section between points 6 and 7 as the amount of charge in the vehicle-mounted battery 22 is larger than the maximum allowable voltage value.

As such being the case, the main controller 14 transmits a charge request to the information center 13 to request that the vehicle-mounted battery 22 be charged at locations near points 1 and 3 at which the amount of charge in the vehicle-mounted battery 22 decreases below the minimum allowable voltage value. Further, when the vehicle-mounted battery 22 is charged in compliance with such a charge request, the electric power available from the vehicle-mounted battery 22 in the section between points 6 and 7 is more than adequate. Therefore, the main controller 14 transmits a discharge request to the information center 13, at least after the vehicle-mounted battery 22 is charged, to indicate that the vehicle-mounted battery 22 can be discharged at a location before and near point 6.

In response to such a charge request or discharge request, the information center 13 searches for a partner vehicle and a charge discharge site in order to perform an inter-vehicle electric power transmission reception operation during a travel on a route, and transmits the result of the search to a vehicle that has transmitted such a request.

Figure 8:
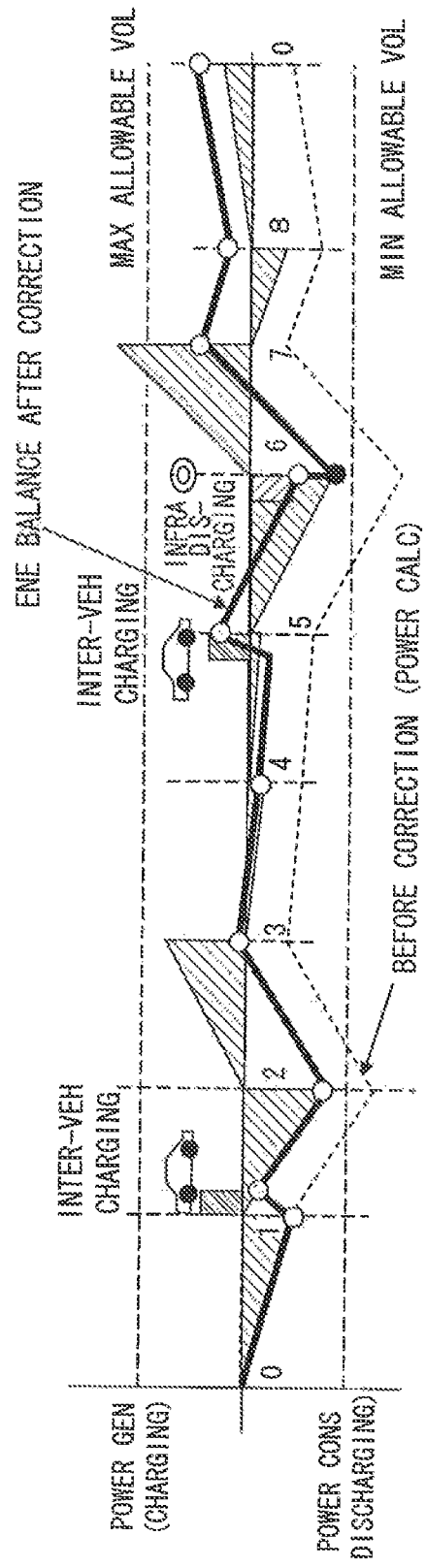
FIG. 8 is a diagram illustrating an energy balance curve in cases where the vehicle-mounted battery is charged by inter-vehicle electric power transmission reception and discharged to an infrastructure.

FIG. 8 shows, as an example, an energy balance curve that is obtained when an inter-vehicle electric power transmission reception operation is performed to charge the vehicle-mounted battery 22 at a location near point 1 and at a location near point 5. As is obvious from the energy balance curve shown in FIG. 8, performing the inter-vehicle electric power transmission reception operation at locations near points 1 and 5 makes it possible to prevent the amount of charge in the vehicle-mounted battery 22 from decreasing below the minimum allowable voltage value in the section between points 1 and 2 and in the section between points 5 and 6. Further, in this case, as the vehicle-mounted battery 22 stores adequate electric power in excess of the minimum allowable voltage value, the amount of charge in the vehicle-mounted battery 22 is more than adequate. Therefore, when the vehicle subsequently travels near point 6, a wireless electric power transmission reception operation can be performed relative to an external infrastructure to transmit (discharge) the electric power from the vehicle to the external infrastructure.

When the necessity of charging/discharging is determined in accordance with the energy balance curve indicative of electric power changes during a travel on a preselected route as described above, a charge request and a discharge request can be issued at an appropriate timing with plenty of time to spare. Therefore, it is highly probable that a charge discharge operation can be performed relative to an infrastructure or a partner vehicle in an area where charging/discharging is required. This makes it possible to ensure that the amount of charge in the vehicle-mounted battery 22 of each vehicle 11 is maintained within an appropriate range.

The configuration of the information center 13 will now be described with reference to FIG. 9. As shown in FIG. 9, the information center 13 includes, for example, a main controller 40, a vehicle-to-center information communication antenna 41, a communication data processing circuit 42, a charge discharge vehicle management database 43, and an electric power transmission reception area database 44. The main controller 40 is a core of the information center 13, and includes a CPU as a principal component to exercise overall operational control of the information center 13.

The vehicle-to-center information communication antenna 41 exchanges various information with the information center 13 and with each vehicle 11 through a wireless communication link. The information received by the vehicle-to-center information communication antenna 41 is demodulated by the communication data processing circuit 42 and input into the main controller 40.

Upon receipt of information including a charge request from a vehicle, the main controller 40 records various information about the vehicle into a charge-requesting vehicle database included in the charge discharge vehicle management database 43. Upon receipt of information including a discharge request from a vehicle, the main controller 40 records various information about the vehicle into a discharge-requesting vehicle database included in the charge discharge vehicle management database 43. Once a charge-requesting vehicle and a discharge-requesting vehicle are registered in the respective databases, the information center 13 periodically communicates with the vehicles to update the information recorded in the databases.

FIGS. 10A and 10B respectively show an example of the charge-requesting vehicle database and an example of the discharge-requesting vehicle database. As shown in FIGS. 10A and 10B, data recorded in the charge-requesting vehicle database and discharge-requesting vehicle database includes, for example, a vehicle ID set for each vehicle 11, positional information indicative of the present location and traveling direction of each vehicle 11, a destination point (or a route to the destination point), a requested charge amount or a requested discharge amount, a charge-demanding area or a discharge-demanding area, a charge discharge function class (performance), a present battery capacity, user characteristics indicative of reliability calculated from the result of inter-vehicle electric power transmission reception, a vehicle type, a size, performance of safety functions such as a collision prevention device function and an adaptive cruise control function, a vehicle-specific traveling loss limit setting for inter-vehicle charge discharge, and a traveling style for inter-vehicle charge discharge (front, rear, or midway).

However, the items of data recorded in the charge-requesting vehicle database and discharge-requesting vehicle database shown in FIGS. 10A and 10B are merely examples. All such items of data need not always be recorded. Conversely, the databases may include data other than those listed in FIGS. 10A and 10B. For example, a desired partner vehicle size may be recorded in the databases.

The electric power transmission reception area database 44 included in the information center 13 records predetermined road sections of various roads in which electric power transmission reception is to be achieved (electric power transmission reception areas).

The aforementioned inter-vehicle electric power transmission reception is achieved when the charge-requesting vehicle and discharge-requesting vehicle perform an electric power transmission, reception operation while, for example, traveling in a row. Therefore, it may be preferred that the inter-vehicle electric power transmission reception operation be performed on a straight road in order to easily maintain the positional relationship between the charge-requesting vehicle and discharge-requesting vehicle. Further, the traveling speeds of the vehicles are often relatively low during inter-vehicle electric power transmission reception. Therefore, a road section provided with a dedicated lane for inter-vehicle electric power transmission reception or at least a particular road section of a multi-lane road is predetermined as an electric power transmission reception area to prevent surrounding traffic from being obstructed.

When a charge request and a discharge request are transmitted from vehicles 11, the main controller 40 of the information center 13 registers them in the aforementioned charge-requesting vehicle database and discharge-requesting vehicle database. Then, in accordance with information recorded in the databases, the main controller 40 extracts an appropriate pair of charge-requesting and discharge-requesting vehicles for inter-vehicle electric power transmission reception and determines them as the paired vehicles. Next, the main controller 40 conveys information about a partner vehicle and information about an electric power transmission reception site (electric power transmission reception area) to the determined paired vehicles to obtain an approval for the inter-vehicle electric power transmission reception defined by the conveyed information. When the approval is received from both vehicles, the main controller 40 is determined to achieve inter-vehicle electric power transmission reception.

Various control processes performed by the electric power transmission reception system 10 having the above-described configuration will now be described with reference, for instance, to a flowchart.

First of all, a process of determining a partner vehicle for inter-vehicle electric power transmission reception will be described with reference to the flowchart of FIG. 11.

At first, in S100, the electric power transmission reception apparatus 12 of a vehicle 11 calculates and stores the aforementioned energy balance curve. Next, S110 is performed to judge in accordance with the calculated energy balance curve whether charging/discharging is required. If the judgment result obtained in S110 indicates that charging/discharging is required, processing proceeds to S120. If, on the other hand, the judgment result indicates that charging/discharging is not required, processing returns to S100. The estimated energy balance curve may change during a vehicle travel so that the judgment result changes to indicate the necessity of charging/discharging although the previous judgment did not indicate such a necessity. Therefore, if the judgment result obtained in S110 indicates that charging/discharging is not required, S100 is repeatedly performed.

In S120, a map database stored in the map storage device 30 is referenced to judge whether there is an infrastructure near an area where charging/discharging is required. If the judgment result obtained in S120 indicates that there is such an infrastructure, processing proceeds to S130. If, on the other hand, the judgment result indicates that there is no such an infrastructure, processing proceeds to S170. S130 is performed to calculate the time required for charging/discharging at the infrastructure in accordance, for instance, with a requested charge discharge amount. Next, S140 is performed to present, for example, the charge discharge time calculated in S130, the location of the infrastructure, and the fee to an occupant of the vehicle 11 for the purpose of judging whether a charge discharge operation is to be performed at the infrastructure.

If the judgment result obtained in S150 indicates that the occupant of the vehicle 11 has approved of the charge discharge operation at the infrastructure, processing proceeds to S160. In S160, the display device 17 displays, for example, a route to the infrastructure for charge discharge to direct the vehicle 11 to the infrastructure. If, on the other hand, the judgment result obtained in S150 indicates that the occupant of the vehicle 11 has not approved of the charge discharge operation at the infrastructure, processing proceeds to S170.

In S170, a request for performing an inter-vehicle electric power transmission reception is transmitted to the information center 13. The request for performing an inter-vehicle electric power transmission reception includes a vehicle ID, positional information, a destination point (or a planned route), a requested charge amount or discharge amount, a charge-demanding area or a discharge-demanding area, and other items of information to be recorded into the aforementioned charge-requesting vehicle database and discharge-requesting vehicle database.

Upon receipt of the above-mentioned request for performing an inter-vehicle electric power transmission reception, the information center 13 records information received from a vehicle 11 having a charge request into the charge-requesting vehicle database and records information received from a vehicle 11 having a discharge request into the discharge-requesting vehicle database. In S180, the information center 13 references the charge discharge vehicle management database 43 and the electric power transmission reception area database 44 to search for the charge-requesting vehicle and discharge-requesting vehicle to be paired for inter-vehicle electric power transmission reception, and determines the vehicles to be paired.

Figure 12:
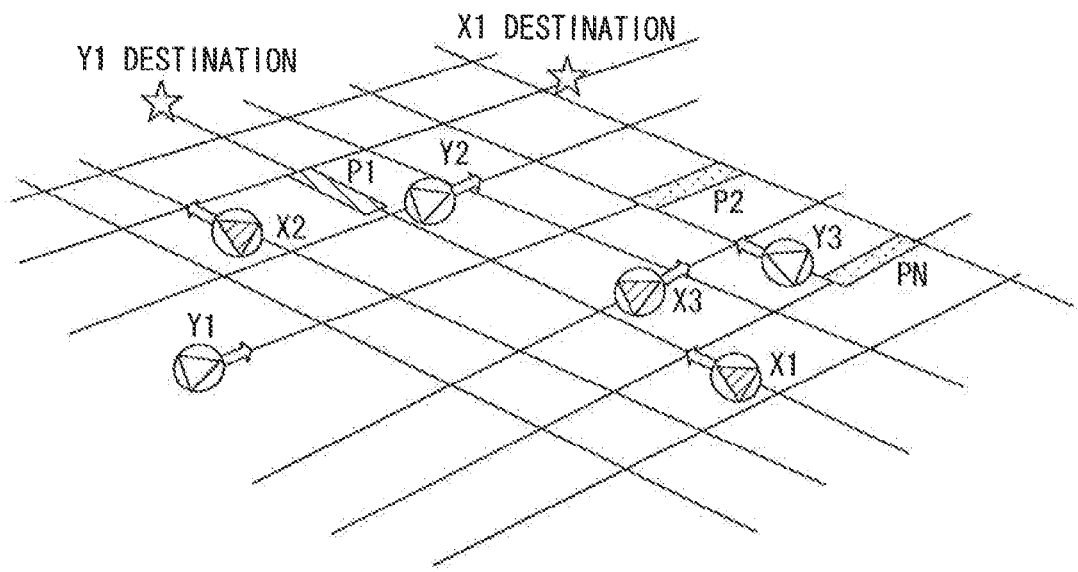
FIG. 12 is a conceptual diagram illustrating a manner of determining vehicles to be paired.
Figure 13:
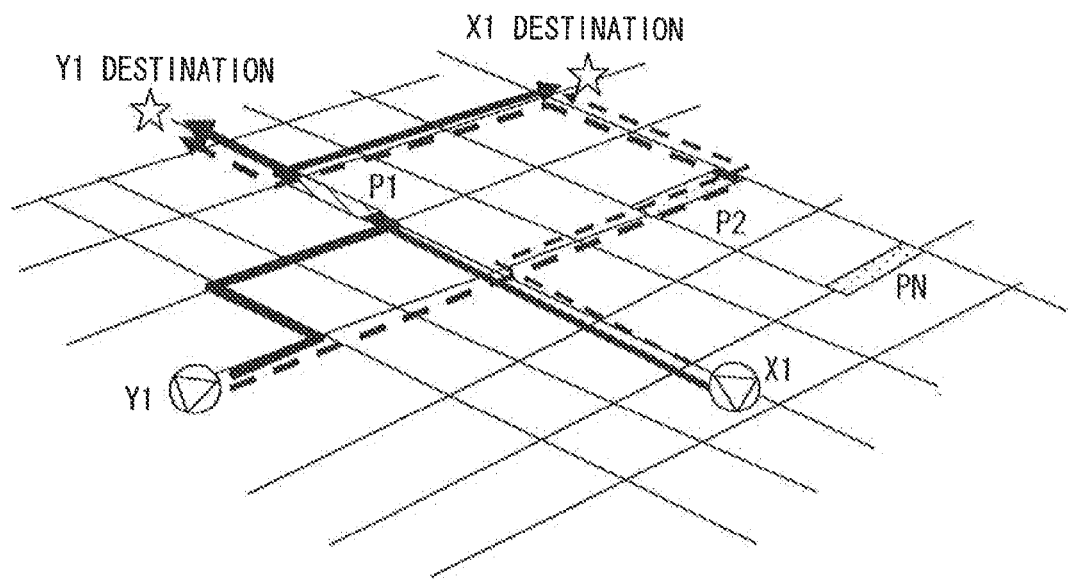
FIG. 13 is an conceptual diagram illustrating the manner of determining the vehicles to be paired.

The method of determining the vehicles to be paired will now be described in detail. FIGS. 12 and 13 are conceptual diagrams illustrating the method of determining the vehicles to be paired. In FIGS. 12 and 13, vehicles X1 to X3 are charge-requesting vehicles having a charge request, whereas vehicles Y1 to Y3 are discharge-requesting vehicles having a discharge request. The symbols P1, P2, and so on to PN denote road sections defined as an electric power transmission reception area.

First of all, a search region within a predetermined range is defined to search for charge-requesting vehicles X1 to X3 and discharge-requesting vehicles Y1 to Y3 included in the search region. Destination points of charge-requesting vehicles X1 to X3 and discharge-requesting vehicles Y1 to Y3, which were searched for, are then confirmed to calculate routes to the destination points.

The results of the calculations then indicate that both charge-requesting vehicle X1 and discharge-requesting vehicle Y1 suffer from substantially no traveling loss when they perform an inter-vehicle electric power transmission reception operation in electric power transmission reception area P1 while traveling along their routes to their destination points. In other words, charge-requesting vehicle X1 and discharge-requesting vehicle Y1 travel in such directions that they move toward each other. If vehicles X1 and Y1 perform an inter-vehicle electric power transmission reception operation in electric power transmission reception area P1, inter-vehicle electric power transmission reception can be achieved, as shown in FIG. 13, without causing vehicles X1 and Y1 to significantly deviate from their routes to their destination points, that is, without causing them to suffer from a traveling loss. If area P2 is selected as an electric power transmission reception area for inter-vehicle electric power transmission reception between charge-requesting vehicle X1 and discharge-requesting vehicle Y1, discharge-requesting vehicle Y1 is forced to travel on a route that is significantly deviated from its route to its destination point as shown in FIG. 13. In the above case, therefore, electric power transmission reception area P1 is selected, instead of electric power transmission reception area P2, as a site at which inter-vehicle electric power transmission reception is to be achieved between vehicles X1 and Y1.

A control process for determining the above-described paired vehicles will now be described in detail with reference to the flowcharts of FIGS. 14 and 15 and to the explanatory diagram of FIG. 16. Processing indicated in the flowcharts of FIGS. 14 and 15 are periodically performed at predetermined time intervals.

Figure 14:
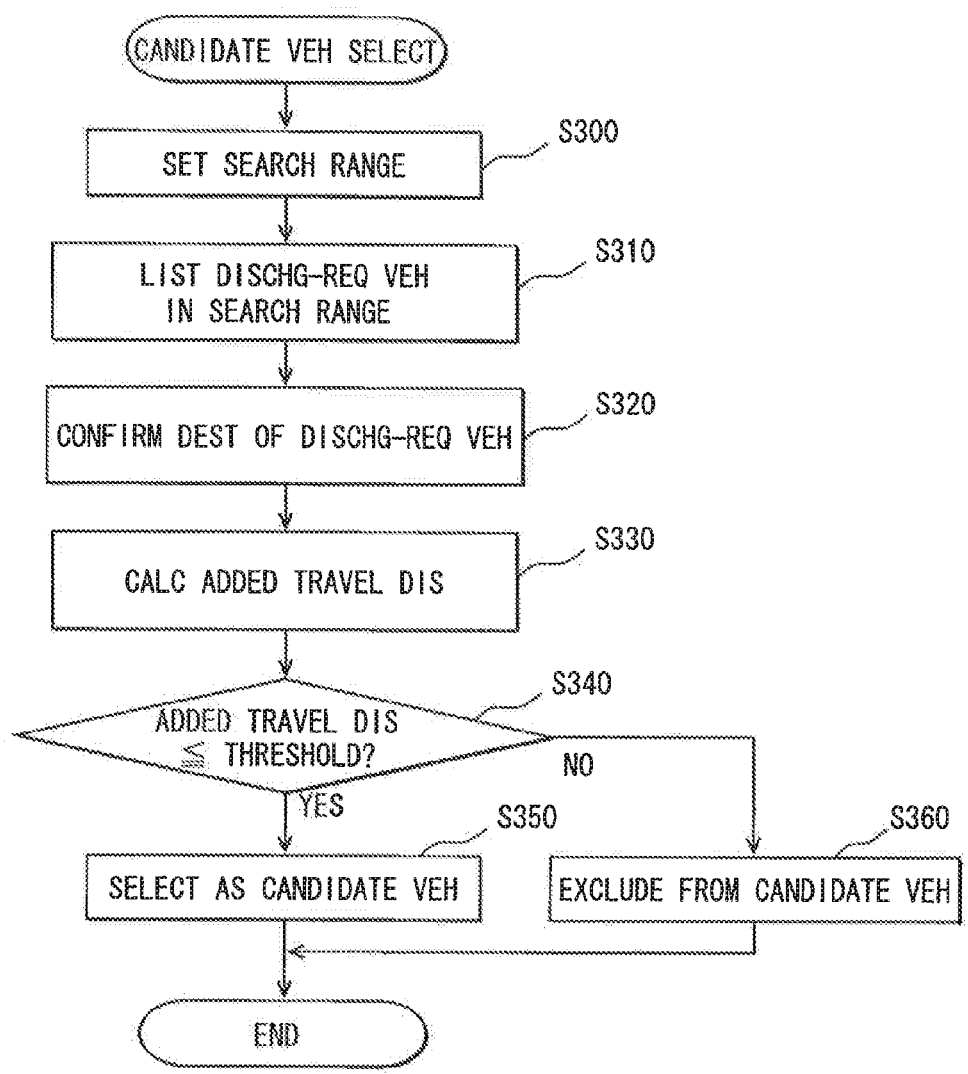
FIG. 14 is a flowchart illustrating processing for selecting candidate vehicles to determine the vehicles to be paired.
Figure 15:
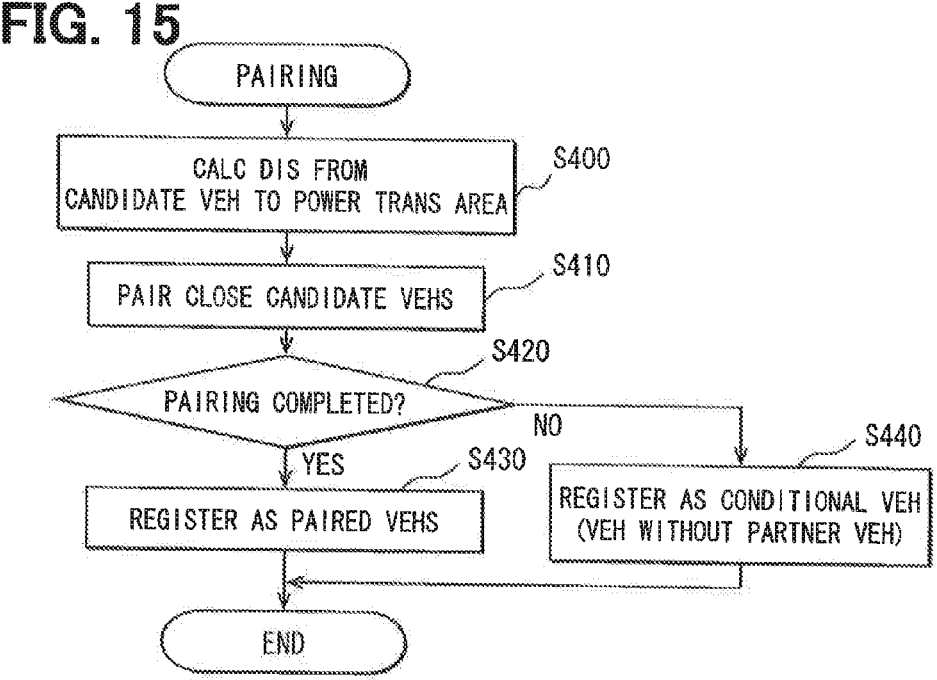
FIG. 15 is a flowchart illustrating processing for selecting the vehicles to be paired from candidate vehicles.

First of all, S300, which is shown in the flowchart of FIG. 14, is performed to set a distance range for searching for a charge-request vehicle and a discharge-requesting vehicle. As shown in FIG. 16, the search distance range is set for each electric power transmission reception area with reference, for instance, to the beginning of each electric power transmission reception area. The search distance range is set so as to include multiple electric power transmission reception areas. Therefore, the subsequent steps may be performed for each electric power transmission reception area.

Next, in S310, the charge-requesting vehicle database and discharge-requesting vehicle database are referenced to list charge-requesting vehicles and discharge-requesting vehicles included in the search distance range. It may be preferred that charge-requesting vehicles and discharge-requesting vehicles whose electric power transmission reception area is included in a charge-demanding area and discharge-demanding area recorded in each database be listed in consideration of the charge-demanding area and discharge-demanding area recorded in each database. This makes it possible to list vehicles in need of electric power transmission reception at an appropriate timing.

It may be also preferred that the positional information about each vehicle be corrected in accordance with a time lag between the timing at which the above list is made and the timing at which information is recorded in a database. More specifically, the charge-requesting vehicles and discharge-requesting vehicles included in the search distance range should be listed on the presumption that each vehicle has advanced in a direction toward a destination point by a distance corresponding to the time lag.

Charge-requesting vehicles and discharge-requesting vehicles already determined as paired vehicles are not to be listed even if they exist within the search distance range. FIG. 16 shows an example in which vehicles X1, X2, and X3 are extracted as charge-requesting vehicles while vehicles Y1, Y2, and Y3 are extracted as discharge-requesting vehicles.

Next, in S320, the destination points of the charge-requesting vehicles and discharge-requesting vehicles listed in S310 are confirmed to calculate routes to their respective destination points. As for a vehicle whose route to its destination point was already calculated in a previous process, such a previously calculated route may be used. Further, if a route to a destination point is recorded in a database, it may be used as is. In FIG. 16, sites marked with a star denote the destination points of vehicles X1 to X3 and vehicles Y1 to Y3.

Next, S330 is performed to calculate a route that is used when each vehicle travels in an electric power transmission reception area included in the search distance range, and compare the calculated route with the route calculated in S320 to determine an additional traveling distance. Next, S340 is performed to judge whether the calculated additional traveling distance is not longer than a setting. This judgment may be formulated by predetermining a reference distance value as the setting and comparing the additional traveling distance with the reference distance value or by determining, for example, the ratio between each vehicle's traveling distance from the present location to the destination point and the traveling distance along a route to the destination point to be reached through the electric power transmission reception area and comparing the determined ratio with a reference ratio value. The reference distance value and the reference ratio value may be set by an occupant of each vehicle and communicated to the information center. In such an instance, the reference distance value and reference ratio value recorded in a database as vehicle-specific values are used.

If the judgment result obtained in S340 indicates that the additional traveling distance is not longer than the setting, processing proceeds to S350 so that the associated vehicle is selected as a candidate vehicle that performs an electric power transmission reception operation in the above-described electric power transmission reception area. If, on the other hand, the judgment result obtained in S340 indicates that the additional traveling distance is longer than the setting, processing proceeds to S360 so that the associated vehicle is not longer counted as a candidate vehicle that performs an electric power transmission reception operation in the above-described electric power transmission reception area.

Figure 16:
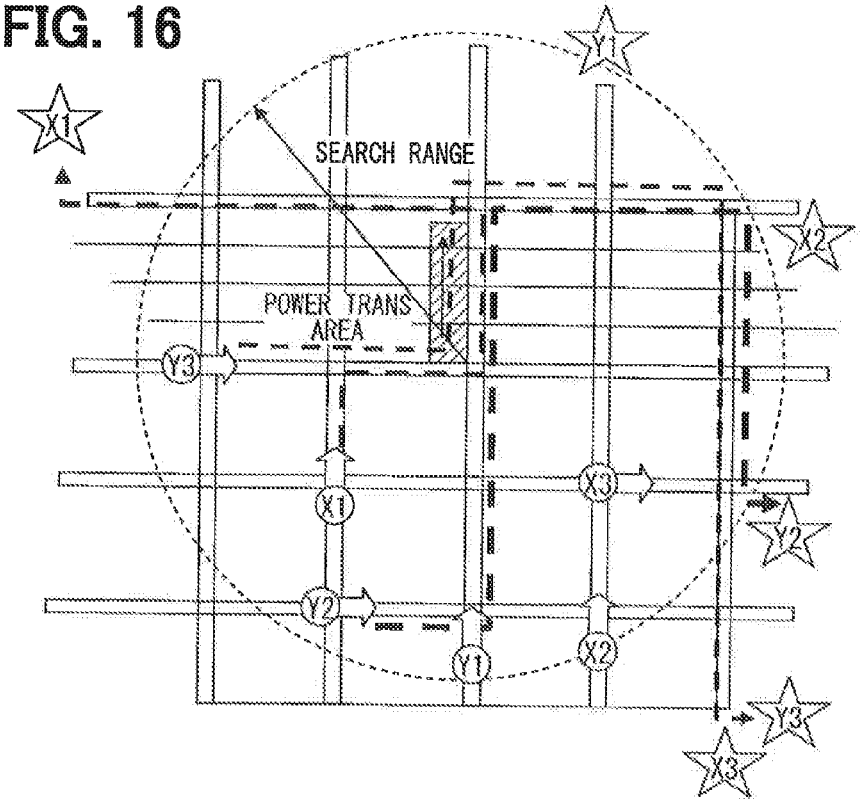
FIG. 16 is a diagram illustrating details of a process performed to determine the vehicles to be paired.

If, for instance, the example shown in FIG. 16 is used to determine the additional traveling distance of each vehicle as the ratio between each vehicle's traveling distance from the present location to the destination point and the traveling distance along a route to the destination point to be reached through the electric power transmission reception area, X1=1.5, X2=1.2, X3=3, Y1=1 (no additional traveling distance), Y2=2, and Y3=1.3. If, in this instance, the reference ratio value is set to 1.5, vehicle X3, which is a charge-requesting vehicle, is no longer counted as a candidate vehicle, and vehicle Y2, which is a discharge-requesting vehicle, is not longer counted as a candidate vehicle.

Next, S400, which is shown in the flowchart of FIG. 15, is performed to calculate the distance between the electric power transmission reception area and each vehicle selected as a candidate vehicle as indicated in the flowchart of FIG. 14 (or the time required for each vehicle to reach the electric power transmission reception area). The distance to be calculated in this step is the distance that each vehicle travels along a route between the present location and the electric power transmission reception area. The time to be calculated in this step is the time that each vehicle would take to travel along a route to the electric power transmission reception area at a standard speed.

Next, S410 is performed to select a candidate vehicle having a charge request and a candidate vehicle having a discharge request that are similar to each other in the distance (or required time) calculated in S400, and determine the selected vehicles as the paired vehicles. There is a predetermined upper limit value for the difference between the calculated distances (or required times). Candidate vehicles whose difference is the smallest and not greater than the upper limit value are selected. In the example shown in FIG. 16, a combination of charge-requesting vehicle X1 and discharge-requesting vehicle Y3 and a combination of charge-requesting vehicle X2 and discharge-requesting vehicle Y1 are determined as the paired vehicles because they are similar to each other in the distance to the electric power transmission reception area.

Next, S420 is performed to judge whether all the vehicles within the search distance range have been subjected to the above-described pairing process. Vehicles determined as paired vehicles are registered in S430 as paired vehicles. If any vehicle is not determined as a paired vehicle, it is registered in S440 as a conditional vehicle, which involves a wait in the electric power transmission reception area because a partner vehicle traveling in the electric power transmission reception area at the same time was not found, or as a vehicle for which no partner vehicle was found. If, in such an instance, an occupant's approval is obtained after notifying the occupant that the associated vehicle has to wait, the upper limit value for the difference between the calculated distances (or required times) may be increased to search for vehicles to be paired.

Figure 11:
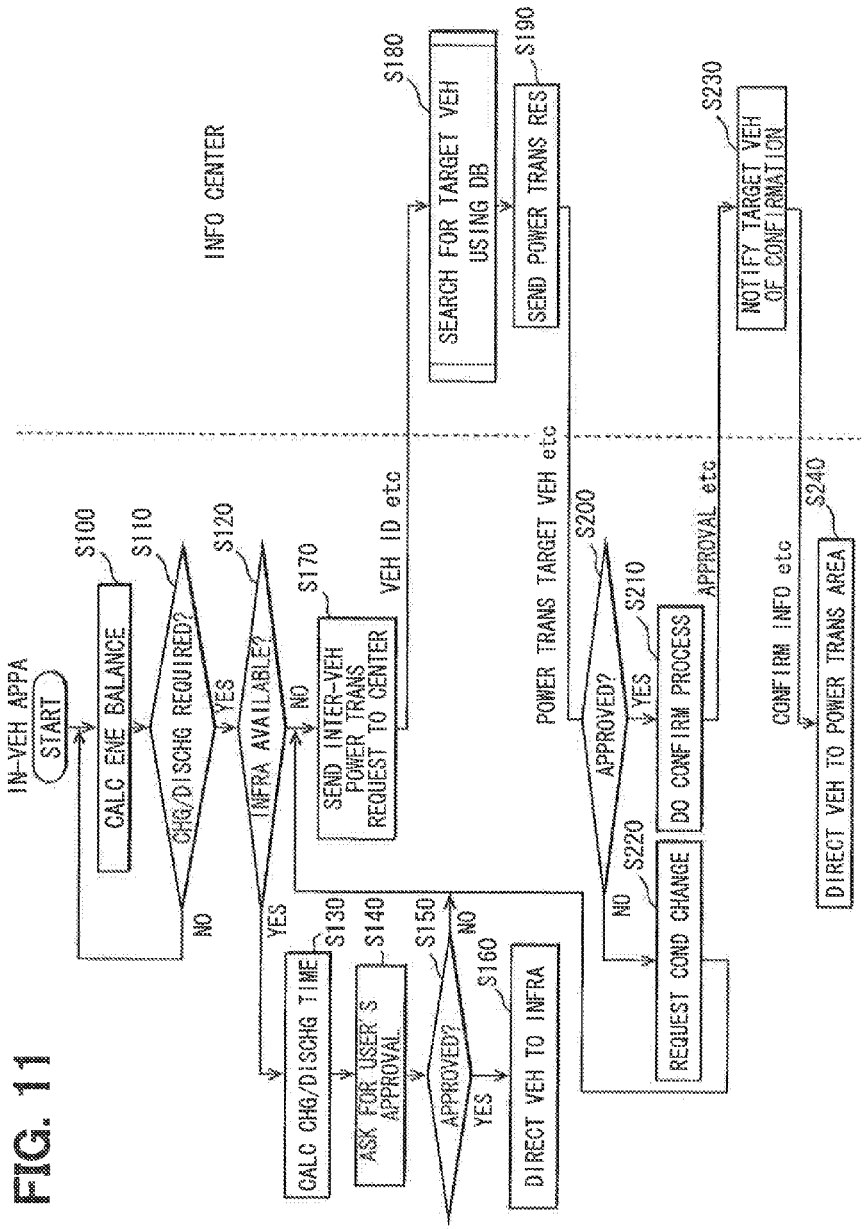
FIG. 11 is a flowchart illustrating processing for determining a partner vehicle for inter-vehicle electric power transmission reception.

Referring back to the flowchart of FIG. 11, when a paired vehicle is determined by the above-described process, the information center 13 performs S190 to send a response to the paired vehicle to indicate that an inter-vehicle electric power transmission reception operation can be performed because a partner vehicle is found. In such an instance, the information center 13 also transmits relevant information to the paired vehicle, including information about the partner vehicle for inter-vehicle electric power transmission reception and information about the electric power transmission reception area, an estimated charge (discharge) amount, and a fee.

In S200, the vehicle 11 then causes the display device 17 and/or the loudspeaker 18 to convey the received information to the occupant of the vehicle 11. The occupant of the vehicle 11 then uses the input device 31 to state whether or not to approve of the inter-vehicle electric power transmission reception indicated by the received information. When the occupant approves of the inter-vehicle electric power transmission reception, the occupant performs S210 to decide on the inter-vehicle electric power transmission reception. More specifically, the occupant returns an approval of the inter-vehicle electric power transmission reception indicated by the received information and final conditions for confirmation to the information center 13.

If the information center 13 receives an approval of the inter-vehicle electric power transmission reception from both vehicles determined as the paired vehicles, the information center 13 performs S230 to notify both vehicles that the inter-vehicle electric power transmission reception is to be executed. In this instance, the information center 13 also transmits final information about the partner vehicle and electric power transmission reception area, final conditions such as the fee, and a schedule of charge discharge in the electric power transmission reception area. Upon receipt of such final information, the vehicle proceeds to S240 and guides, for instance, the driver of the vehicle to the electric power transmission reception area by causing, for example, the display device 17 to display a suggested route to the electric power transmission reception area where the inter-vehicle electric power transmission reception is to be performed.

If, on the other hand, the occupant does not approve of the electric power transmission reception, the occupant proceeds to S220 and uses the input device 31 to make a request for condition changes. If, for instance, the own vehicle is a passenger car and a heavy vehicle is extracted as the partner vehicle for electric power transmission reception, it is difficult for a driver of the own vehicle to obtain an unobstructed front view or rear view while the own vehicle is traveling in a row and performing a charge discharge operation relative to the heavy vehicle. Hence, the driver of the own vehicle may hope that the size of the partner vehicle is not larger than the size of the own vehicle. Further, if the charge discharge amount provided by a single charge discharge process is extremely small, the driver may hope to perform an inter-vehicle electric power transmission reception operation relative to another vehicle that provides a larger charge discharge amount.

When a request for condition changes is to be made, the occupant examines the information received from the information center 13 and inputs desired changes to be applied to the received information. Then, in S170, an inter-vehicle electric power transmission reception request including the desired changes is transmitted to the information center 13. Upon receipt of such a request, the information center 13 checks for a partner vehicle that fulfills the hope of the occupant of the vehicle. If an appropriate partner vehicle is found, the information center 13 transmits its response to indicate that an inter-vehicle electric power transmission reception operation is to be performed relative to that partner vehicle.

When the method of determining the vehicles to be paired as described with reference to the flowcharts of FIGS. 14 and 15 is used, it is assumed that the vehicles to be paired can travel in the electric power transmission reception area at the same time without suffering from an excessive traveling loss. Alternatively, however, the vehicles to be paired may be determined in consideration of the other information recorded in the charge-requesting vehicle database and discharge-requesting vehicle database.

For example, if multiple discharge-requesting vehicles are capable of traveling in the same electric power transmission reception area at the same time as a certain charge-requesting vehicle, the vehicles to be paired may be determined in consideration of the requested charge amount and requested discharge amount. In other words, a discharge-requesting vehicle having a requested discharge amount closest to the requested charge amount of the charge-requesting vehicle may be selected from the discharge-requesting vehicles and determined as the vehicle to be paired. This makes it possible to determine the paired vehicles by extracting vehicles whose requested charge amount and requested discharge amount are closest to each other.

Further, a request may be received from the occupant (user) of each vehicle, before the vehicles to be paired are determined, to search for a partner vehicle that matches the request. For example, the user may hope that the size of the partner vehicle for inter-vehicle charge discharge is the same as the size of the own vehicle as mentioned earlier. The user may also hope to cover at least 90 percent of the requested charge discharge amount by a single inter-vehicle electric power transmission reception operation, have the fee reduced as much as possible, or surely achieve a desired charge discharge result even if the fee is large.

As regards the fee, it is possible to employ a fee structure in which a system administrator provides a site close to the beginning of an electric power transmission reception area with various types of vehicles capable of fulfilling a request for inter-vehicle electric power transmission reception, enables the user to perform an inter-vehicle electric power transmission reception operation relative to a vehicle provided by the system administrator, and charges the user a fee that is higher than the fee for an inter-vehicle electric power transmission reception operation relative to a normal vehicle by the cost of use of the vehicle provided by the system administrator. In principle, the user pays the fee when performing a charge operation and receives the fee when performing a discharge operation. However, if the charge discharge operation is performed relative to a vehicle provided by the system administrator, the amount of fee to pay is higher than and the amount of fee to receive is lower than the amount of fee to pay or receive when the charge discharge operation is performed relative to a normal vehicle.

Figure 17:
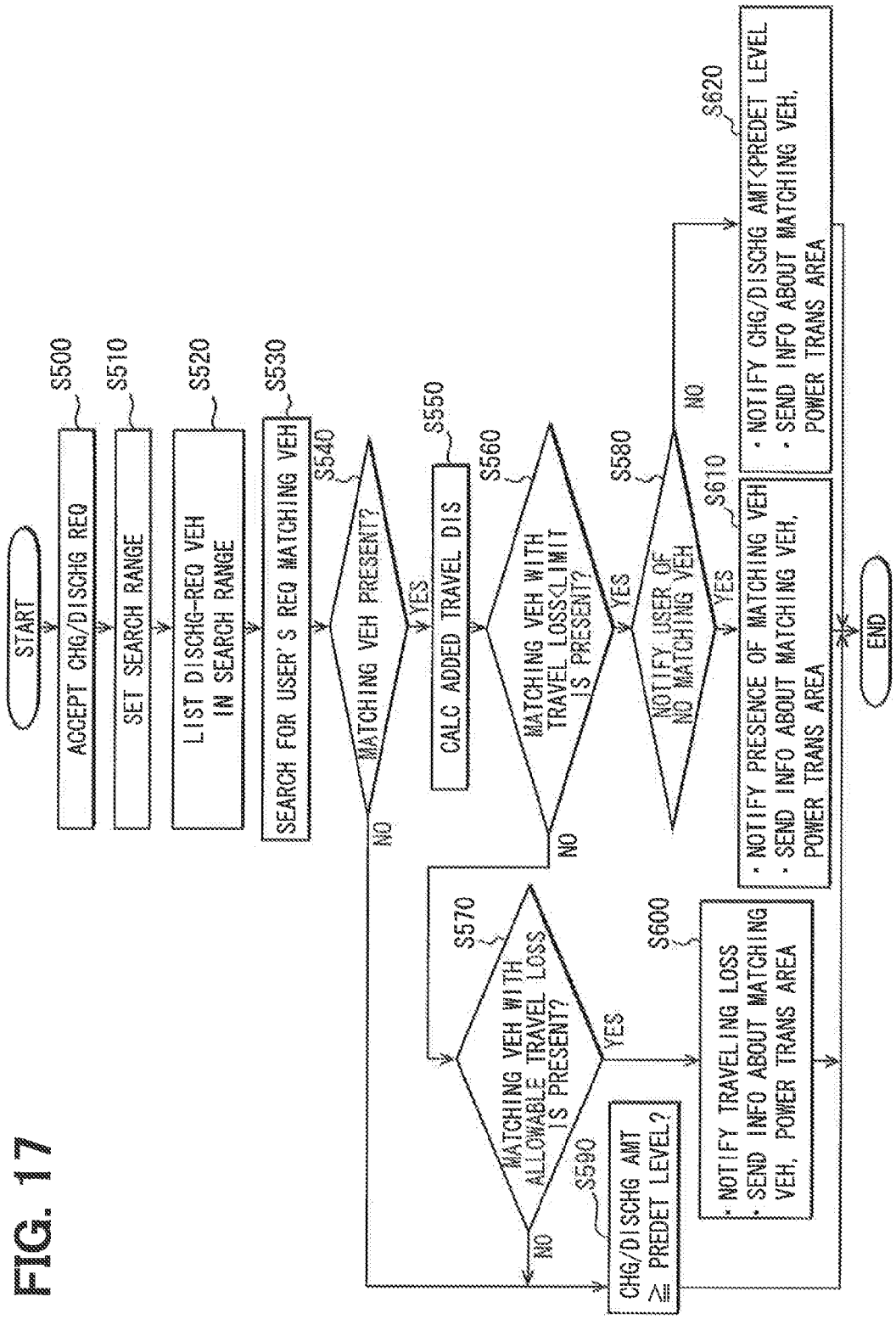
FIG. 17 is a flowchart illustrating processing for determining the vehicles to be paired in consideration of a user request.

A process of determining the vehicles to be paired in consideration of a user's request concerning a vehicle size will now be described with reference to the flowchart of FIG. 17.

First of all, in S500, a charge discharge request is received from vehicles. The received charge discharge request may include a user's request concerning the vehicle size. In S510, the distance range for the search of charge-requesting vehicles and discharge-requesting vehicles is set. In S520, charge-requesting vehicles and discharge-requesting vehicles within the search distance range are listed from the charge-requesting vehicle database and discharge-requesting vehicle database.

Next, S530 is performed to search for a target vehicle that matches the user's request, which is an additional condition. The target vehicle search is sequentially conducted, for example, on the charge-requesting vehicles and discharge-requesting vehicles listed in S520 in the order in which their charge discharge requests were received. In other words, the target vehicle search may be preferentially conducted to find a vehicle that matches a request included in a charge discharge request received at a relatively early timing.

S540 is then performed to judge whether a target vehicle that matches a request (a matching vehicle) is found. If such a matching vehicle is found, processing proceeds to S550. If no matching vehicle is found, processing proceeds to S590. S550 is performed to calculate an additional traveling distance that the matching vehicle travels through an electric power transmission reception area. If multiple matching vehicles are found, the additional traveling distance is calculated for each matching vehicle. Next, S560 is performed to search for a matching vehicle whose traveling loss caused by the additional traveling distance is not higher than a allowable level. If a matching vehicle whose traveling loss is not higher than the allowable level is found, processing proceeds to S580. If, on the other hand, no such a matching vehicle is found, processing proceeds to S570.

S570 is performed to further search for a matching vehicle whose traveling loss is not higher than a limit level. In the example presented in the flowchart of FIG. 17, two different traveling loss levels (allowable level<limit level) are predefined as described above to facilitate the search for a target vehicle that matches the user's request. If a matching vehicle whose traveling loss is not higher than the limit level is found in S570, processing proceeds to S600. If, on the other hand, no such a matching vehicle is found, processing proceeds to S590.

In S590, the user is notified that no matching vehicle is found. In S600, on the other hand, the user is notified that there is a matching vehicle that suffers from a certain amount of traveling loss. In this step, relevant information, such as the information about the matching vehicle and about an electric power transmission reception area, is also transmitted to the user.

If the judgment result obtained in S560 indicates that there is a matching vehicle whose traveling loss is not higher than the allowable level, processing proceeds to S580. S580 is performed to judge whether the charge discharge amount is not lower than a predetermined level. If the charge discharge amount is found to be not lower than the predetermined level, processing proceeds to S610. If, on the other hand, the charge discharge amount is found to be lower than the predetermined level, processing proceeds to S620.

In S610, the user is notified that a matching vehicle is found. In this step, relevant information, such as the information about the matching vehicle and about an electric power transmission reception area, is also transmitted to the user. In S620, on the other hand, the user is notified that there is a matching vehicle whose charge amount (or discharge amount) is lower than the predetermined level. In this step, relevant information, such as the information about the matching vehicle and about an electric power transmission reception area, is also transmitted to the user.

If there are multiple matching vehicles whose traveling loss is at the allowable level, S610 is performed so that a matching vehicle whose charge discharge amount is found in S580 to be not lower than the predetermined level is selected as a vehicle for pairing. Further, if there are multiple matching vehicles whose charge discharge amount is not lower than the predetermined level, S610 can be performed on a matching vehicle having a charge discharge amount that is closest to, but not larger than, the charge discharge amount requested by the own vehicle.

An alternative is to skip S580 and directly proceed to S610 if the judgment result obtained in S560 indicates that there is a matching vehicle whose traveling loss is not higher than the allowable level.

Figure 18:
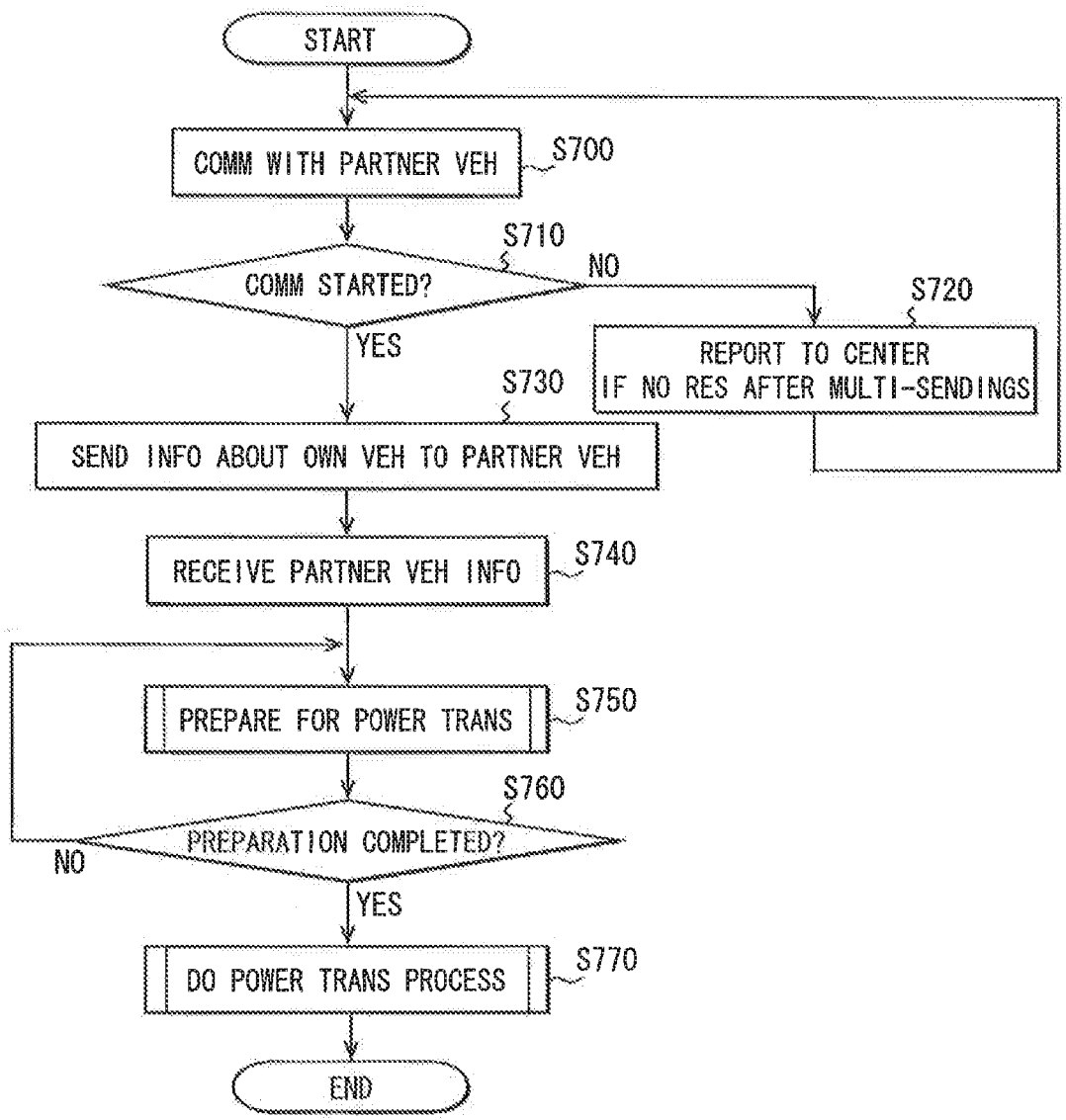
FIG. 18 is a flowchart illustrating processing for achieving electric power transmission reception after a charge-request vehicle and a discharge-requesting vehicle, which are determined as the vehicles to be paired, encounter each other at a beginning of an electric power transmission reception area.

A process for allowing a charge-requesting vehicle and a discharge-requesting vehicle, which are determined as the paired vehicles, to encounter each other at the beginning of an electric power transmission reception area and perform an electric power transmission reception operation will now be described with reference to the flowchart of FIG. 18.

First of all, in S700, when a own vehicle determined as one of the paired vehicles arrives at a target electric power transmission reception area, it begins to communicate with a partner vehicle, which is determined as the other one of the paired vehicles. This communication begins when, for instance, one of the paired vehicles transmits radio waves to the other vehicle having a vehicle ID transmitted from the information center 13 through the inter-vehicle information communication antenna 26. Either a charge-requesting vehicle or a discharge-requesting vehicle may be predetermined as the vehicle that transmits the radio waves. Alternatively, the information center 13 may designate the vehicle that transmits the radio waves. Another alternative is to let both vehicles transmit the ratio waves on a periodic basis.

Next, S710 is performed to judge whether the own vehicle has received a response from a partner vehicle as a result of vehicle ID transmission to the partner vehicle and actually communicated with the partner vehicle. If the judgment result obtained in S710 indicates that the own vehicle has not communicated with the partner vehicle, it is highly conceivable that the partner vehicle has not reached the electric power transmission reception area or that an error, such as a fault in a communication device, has occurred. Therefore, if no response is obtained from the partner vehicle after the transmission is repeated a predetermined number of times, S720 is performed to report the situation to the information center 13.

If, on the other hand, the judgment result obtained in S710 indicates that the own vehicle has communicated with the partner vehicle, S730 is performed to transmit information about the own vehicle to the partner vehicle. Subsequently, in S740, the partner vehicle also transmits information about the partner vehicle to let the own vehicle receive the information about the partner vehicle. The vehicle information exchanged in the above manner between the own vehicle and partner vehicle includes, for example, the location of the vehicle, the positions at which the electric power transmission reception antennas 23 are mounted, the other information about the electric power transmission reception antennas 23, the image of the vehicle, and the type and size of the vehicle. When the partner vehicle for inter-vehicle electric power transmission reception is located by using the above items of information, the vehicles enter the electric power transmission reception area, travel in a row, and prepare for electric power transmission reception in S750. The preparation for electric power transmission reception will be described in detail later with reference to the flowchart of FIG. 19.

When the vehicles travel in a row as described above, the information center 13 usually issues instructions, in accordance with the positions at which the electric power transmission reception antennas 23 of each vehicles are mounted and with the contents of the databases, to specify which vehicle travels ahead of the other. Further, while the vehicles are traveling in a row, it is necessary that their positions do not deviate in the direction of vehicle width while an appropriate inter-vehicle distance is maintained. Therefore, the traveling control device 29 controls the travel of each vehicle.

To prevent the vehicles from entering the electric power transmission reception area before a partner vehicle is found, it may be preferred that an area for waiting be placed near an entrance to the electric power transmission reception area.

Next, S760 is performed to judge whether the preparation for electric power transmission reception is completed. If the judgment result obtained in S760 indicates that the preparation is completed, an electric power transmission reception process starts in S770. The electric power transmission reception process will also be described in detail with reference to the flowchart of FIG. 19. If the judgment result obtained in S760 does not indicate that the preparation is completed, S750 is repeated.

Figure 19:
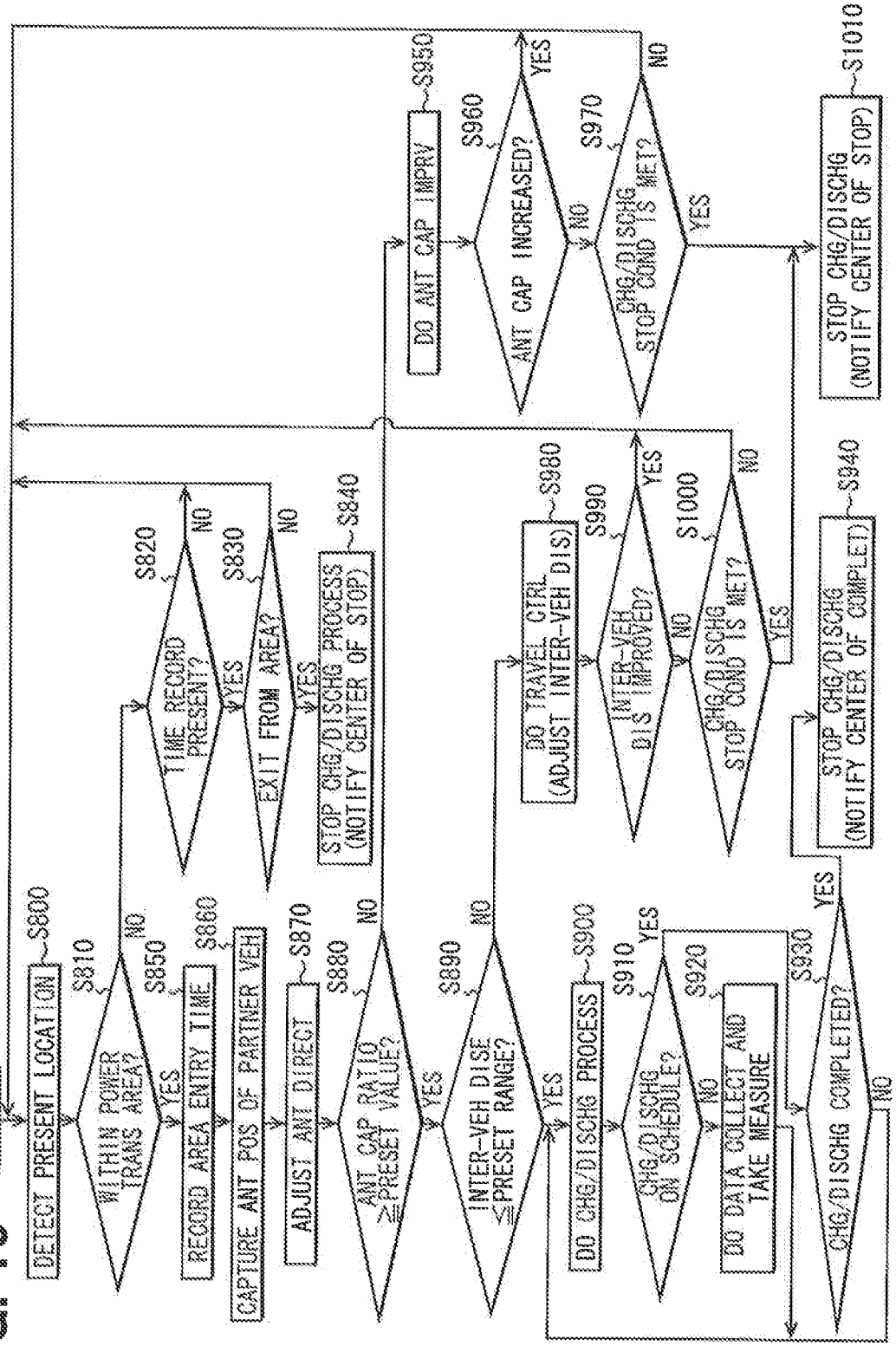
FIG. 19 is a flowchart illustrating processing performed to prepare for electric power transmission reception and achieve electric power transmission reception.

The electric power transmission reception preparation process and the electric power transmission reception process will now be described in detail with reference to the flowchart of FIG. 19. As described earlier, the electric power transmission reception preparation process and the electric power transmission reception process are performed while a charge-requesting vehicle and a discharge-requesting vehicle are traveling in a row. Therefore, when a processing operation indicated in the flowchart of FIG. 19 starts, the vehicles are traveling in a row.

First of all, in S800, each of the vehicles traveling in a row measures a present location by using the positioning device (GPS) 16 and the camera in the traveling information sensor 21. For example, the GPS acquires the coordinates of the present location, whereas the camera locates a zone of the electric power transmission reception area in which processing is performed. Next, S810 is performed to judge, in accordance with the present location measured in S800, whether each vehicle is traveling in the electric power transmission reception area. If the judgment result obtained in S810 does not indicate that each vehicle is in the electric power transmission reception area, processing proceeds to S820, If, on the other hand, the obtained judgment result indicates that each vehicle is in the electric power transmission reception area, processing proceeds to S850.

S820 is performed to judge whether the time of entry into the electric power transmission reception area is recorded. If the judgment result obtained in S820 does not indicate that the time of entry into the electric power transmission reception area is recorded, it is conceivable that the paired vehicles have not arrived in the electric power transmission reception area. In this instance, processing returns to S800. If, on the other hand, the judgment result obtained in S820 indicates that the time of entry into the electric power transmission reception area is recorded, processing proceeds to S830 and judge, in accordance with the present locations of the vehicles, whether the vehicles have left the electric power transmission reception area. If the judgment result obtained in S830 indicates that the vehicles have left the electric power transmission reception area, S840 is performed to stop an inter-vehicle electric power transmission reception process (charge/recharge process) and notify the information center 13 that the process is stopped.

If the judgment result obtained in S810 indicates for the first time that the paired vehicles are in the electric power transmission reception area, it is believed that the paired vehicles traveling in a row have entered the electric power transmission reception area. Therefore, S850 is performed to record the time of entry in the storage device 19. Next, in S860, the antenna positions of a partner vehicle are detected (captured) in accordance with an image picked up by the camera to perform a tracking process. More specifically, the marking indicative of the position of each electric power transmission reception antenna 23 is continuously subjected to image recognition.

Next, in S870, the orientations of the electric power transmission reception antennas 23 are adjusted by changing the angles of the electric power transmission reception antennas 23 of the own vehicle with the antenna drive device 20 until the electric power transmission reception antennas 23 of the own vehicle face the electric power transmission reception antennas 23 of the detected partner vehicle. In such an instance, the luminescent device emits spot-shaped light from the center of each electric power transmission reception antenna 23 toward the direction in which each electric power transmission reception antenna 23 is oriented. A place on which the emitted light is incident is then confirmed by the camera. This makes it possible to verify whether the electric power transmission reception antennas 23 of the own vehicle are properly oriented toward the electric power transmission reception antennas 23 of the partner vehicle.

Next, S880 is performed to measure an antenna capture ratio for a predetermined period of time and judge whether the measured antenna capture ratio is not lower than a setting. The antenna capture ratio is a parameter that is determined by measuring the length of time (in seconds) during which beams of light emitted from the electric power transmission reception antennas 23 of one vehicle exist within the installation region of the other vehicle's electric power transmission reception antennas 23. Therefore, if the measured antenna capture ratio is lower than the setting, the electric power transmission reception antennas 23 are not properly oriented to face each other because the light emitted from the electric power transmission reception antennas 23 of one vehicle is displaced from the installation region of the electric power transmission reception antennas 23 of the other vehicle.

If the judgment result obtained in S880 indicates that the antenna capture ratio is lower than the setting, processing proceeds to S950. In S950, a process of increasing the antenna capture ratio is performed, for instance, by pre-reading the shape of a road and by exercising travel control in which a succeeding vehicle is allowed to acquire the travel data of a preceding vehicle and properly follow the preceding vehicle. If, as a result of the process performed to increase the antenna capture ratio, the judgment result obtained in S960 indicates that the antenna capture ratio is increased, S800 and subsequent steps are repeated. If, on the other hand, the judgment result obtained in S960 does not indicate that the antenna capture ratio is increased in spite of the antenna capture ratio increase process, processing proceeds to S970. S970 is performed to judge whether a charge discharge process stop condition is met. The charge discharge process stop condition is met when, for instance, the antenna capture ratio increase process has been performed a predetermined number of times or the vehicle's present location is outside the electric power transmission reception area. If the charge discharge process stop condition is not met, S800 and subsequent steps are repeated. If, on the other hand, the charge discharge process stop condition is met, processing proceeds to S1010. In S1010, the charge discharge process is stopped to notify the information center 13 that the charge discharge process is stopped.

If the judgment result obtained in S880 indicates that the antenna capture ratio is not lower than the setting, processing proceeds to S890. S890 is performed to judge whether the inter-vehicle distance between the vehicles traveling in a row is within a predetermined range. If the judgment result obtained in S890 indicates that the inter-vehicle distance is outside the predetermined range, processing proceeds to S980. In S980, the traveling control device 29 is instructed to adjust the inter-vehicle distance until it is within the predetermined range. If the judgment result obtained in S990 indicates that the inter-vehicle distance is improved and within the predetermined range as a result of the adjustment, S800 and subsequent steps are repeated. If, on the other hand, the judgment result obtained in S990 does not indicate that the inter-vehicle distance is improved, processing proceeds to S1000. S1000 is performed to judge whether a charge discharge process stop condition is met. The charge discharge process stop condition is met when, for instance, a traveling control process has been performed a predetermined number of times to adjust the inter-vehicle distance or the vehicle's present location is outside the electric power transmission reception area. If the charge discharge process stop condition is not met, S800 and subsequent steps are repeated. If, on the other hand, the charge discharge process stop condition is met, processing proceeds to S1010. In S1010, the charge discharge process is stopped to notify the information center 13 that the charge discharge process is stopped.

The process performed in S800 to S890 mainly corresponds to the electric power transmission reception preparation process. The process performed in later-described S900 to S940 mainly corresponds to the electric power transmission reception process.

If the judgment result obtained in S890 indicates that the inter-vehicle distance is within the predetermined range, S900 is performed. In S900, the electric power transmission reception process (charge discharge process) is performed between the vehicles traveling in a row. Before the start of the charge discharge process, the resonant frequency and the like are set in a manner appropriate for the electric power transmission reception between the vehicles traveling in a row. Further, slight electric power may be actually transmitted and received before the start of the charge discharge process to verify that an electric power transmission reception operation can be properly performed between the vehicles traveling in a row.

In the electric power transmission reception process in S900, the main controller 14 of an electric power-transmitting vehicle wirelessly transmits electric power stored in the vehicle-mounted battery 22 of the electric power-transmitting vehicle from the electric power transmission reception antennas 23 to a partner vehicle (electric power-receiving vehicle). Meanwhile, the main controller 14 of the electric power-receiving vehicle receives the electric power transmitted from the electric power-transmitting vehicle with the electric power transmission reception antennas 23 and stores the received electric power in the vehicle-mounted battery 22 (charges the vehicle-mounted battery 22 with the received electric power).

As regards the charge discharge operation that is performed relative to the vehicle-mounted battery 22 of each vehicle during the above-described inter-vehicle electric power transmission reception, the information center 13 compiles a charge discharge schedule beforehand and transmits the charge discharge schedule to at least either the electric power-transmitting vehicle or the electric power-receiving vehicle.

Figure 20:
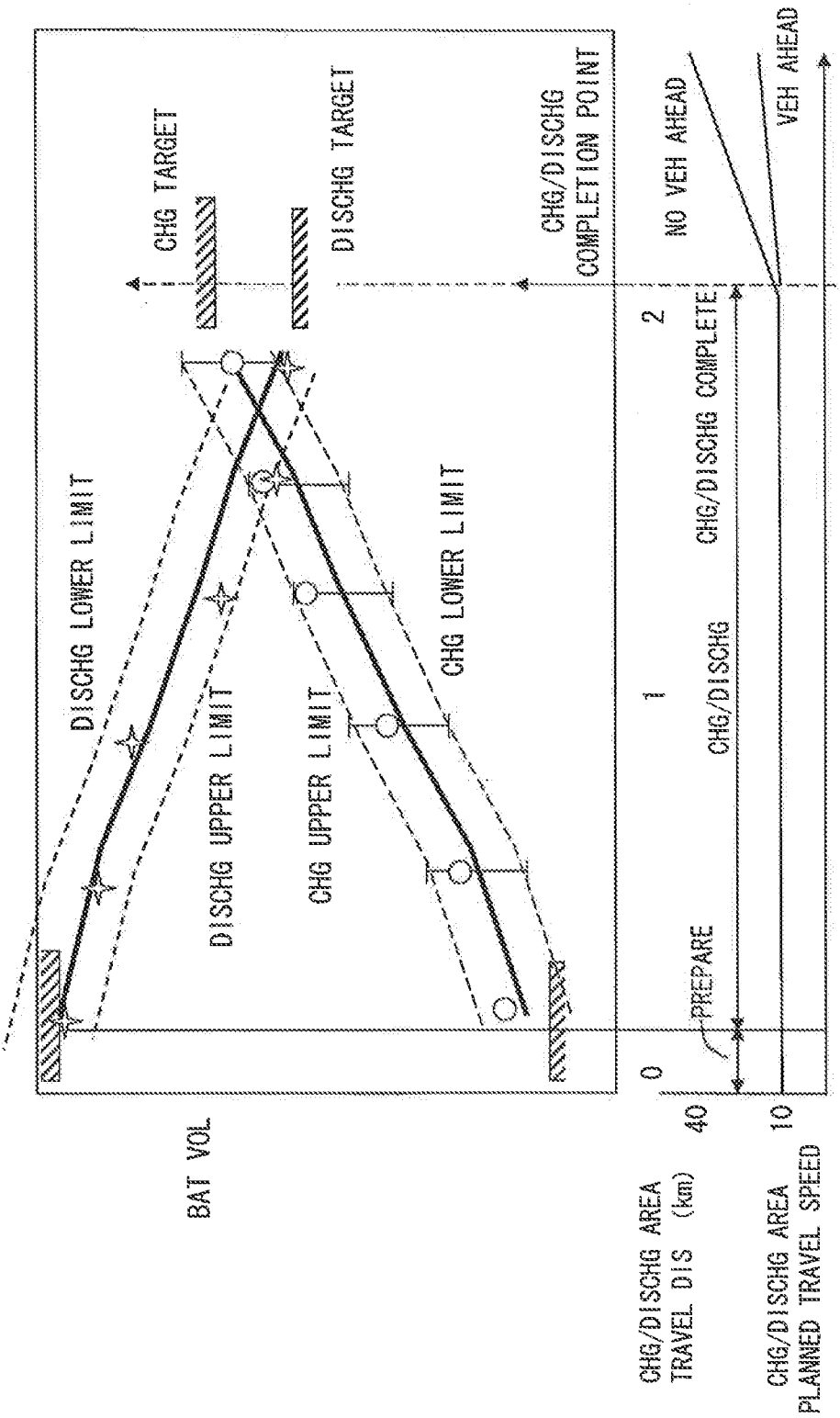
FIG. 20 is a diagram illustrating a charge discharge schedule.

The charge discharge schedule will now be described. As shown in FIG. 20, the charge discharge schedule relates to a case where the paired vehicles perform an electric power transmission reception operation while traveling in a row within the electric power transmission reception area, and indicates charge discharge amount target lines and upper/lower limit lines relative to the traveling distance in the electric power transmission reception area. The charge discharge schedule is transmitted to each of the paired vehicles to let each of them check whether the charge discharge operation is performed in accordance with the charge discharge schedule. Alternatively, however, one of the paired vehicles may acquire information about the charge discharge amount of the vehicle by way of inter-vehicle information communication and check whether the charge discharge operation based on inter-vehicle electric power transmission reception is performed in accordance with the charge discharge schedule.

While an inter-vehicle electric power transmission reception operation is being performed between the electric power-transmitting vehicle and the electric power-receiving vehicle as described above, the main controller 14 of each vehicle continuously controls the travel of the respective vehicle to keep the vehicles traveling in a row appropriate for inter-vehicle electric power transmission reception. Alternatively, the main controller 14 of one of the vehicles may be configured to transmit a traveling control signal to the main controller 14 of the other vehicle and control the travel of each vehicle.

While the charge discharge process is in progress, S910 is performed to judge whether the charge discharge operation is performed in accordance with the charge discharge schedule. More specifically, when the charge discharge process starts, the charge amount and discharge amount of the paired vehicles are periodically measured as shown in FIG. 20 to judge whether the measured values are between the upper and lower limit lines for a charge target line and between the upper and lower limit lines for a discharge target line. If the measured values are between the upper and lower limit lines, the charge discharge operation is found to be in accordance with the schedule. If the measured values are not between the upper and lower limit lines, the charge discharge operation is found to be not in accordance with the schedule.

If the charge discharge operation is not performed in accordance with the schedule, processing proceeds to S920. S920 is performed to collect data on the charge discharge process, investigate the cause of such a problem, and apply an appropriate remedy. This process is performed by acquiring a measured charge discharge value from the partner vehicle and causing both vehicles to investigate the cause of the problem and cooperatively apply an appropriate remedy as needed. In other words, if the cause can be investigated and eliminated by the vehicles, an improvement process is performed. If improvement cannot be successfully effected and charge discharge efficiency does not improve, whether or not the charge discharge process is to be continued is determined in accordance with the charge discharge efficiency. The process performed in S920 will be described in detail later with reference to the flowchart of FIG. 21.

If, on the other hand, the judgment result obtained in S910 indicates that the charge discharge operation is performed in accordance with the schedule, processing proceeds to S930. S930 is performed to judge whether the charge discharge operation is completed. As shown in FIG. 20, the charge discharge operation is found to be completed when either the measured charge mount or the measured discharge amount reaches its final target line. If the charge discharge operation is found to be completed, processing proceeds to S940. S940 is performed to stop the charge discharge process and notify the information center 13 that a charge operation is completed.

Figure 21:
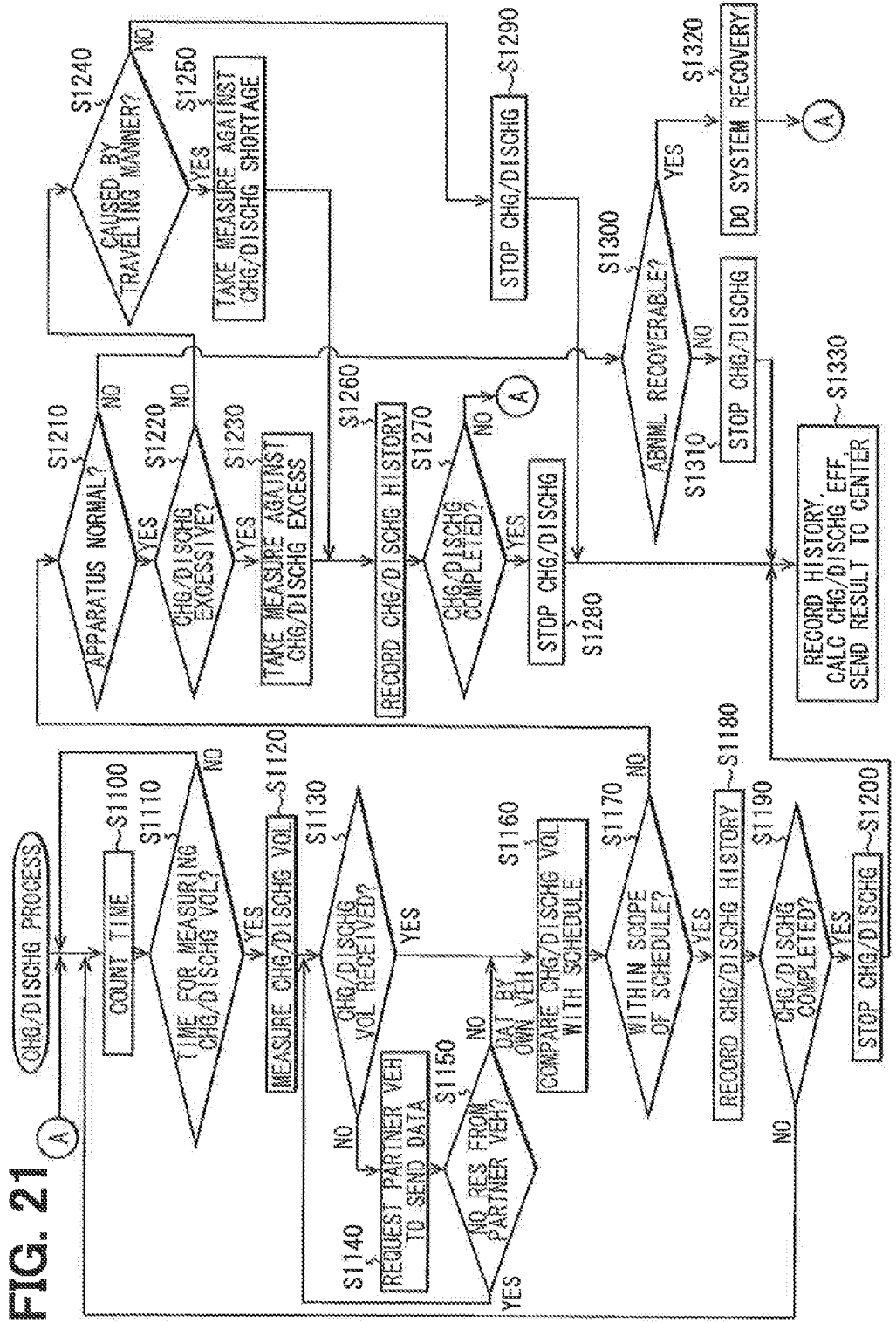
FIG. 21 is a flowchart illustrating processes performed to check for abnormalities in a charge discharge process and recover from any encountered abnormality.

The flowchart of FIG. 21 will now be referenced to describe how to check for an abnormality in the charge discharge and remedy an encountered abnormality.

Referring to the flowchart of FIG. 21, S1100 is performed, first of all, to do a measurement time count. Next, S1110 is performed to judge whether the time for measuring the charge discharge amount (charge discharge voltage) has arrived. If the judgment result obtained in S1110 indicates that the time for charge discharge voltage measurement has arrived, processing proceeds to S1120, In S1120, the charge discharge voltage is measured.

Next, S1130 is performed to judge whether the measured charge discharge voltage is received from the other vehicle (partner vehicle). If the judgment result obtained in S1130 indicates that the measured charge discharge voltage is received, processing proceeds to S1160. If, on the other hand, the judgment result does not indicate that the measured charge discharge voltage is received, processing proceeds to S1140.

S1140 is performed to request the partner vehicle to transmit the measured charge discharge voltage. Next, S1150 is performed to judge whether a response is received from the partner vehicle after a transmission request has been made a predetermined number of times. If the judgment result obtained in S1150 does not indicate that the response is received from the partner vehicle, processing proceeds to S1160. S1160 is performed to judge, in accordance with only the measured charge discharge voltage of the own vehicle, whether the charge discharge operation is performed in accordance with the schedule. If the charge discharge operation is not performed in accordance with the schedule, the cause of such a problem is investigated in S1160 as well. If, on the other hand, the response is received from the partner vehicle or the transmission request has not been made the predetermined number of times, processing returns to S1130.

In S1160, the measured charge discharge voltages of the own vehicle and partner vehicle are compared with the charge discharge schedule. Next, S1170 is performed to judge whether the measured charge discharge voltages of the own vehicle and partner vehicle are within the scope of the charge discharge schedule. If the judgment result obtained in S1170 indicates that the measured charge discharge voltages of the own vehicle and partner vehicle are within the scope of the charge discharge schedule, processing proceeds to S1180. If, on the other hand, the judgment result does not indicate that the measured charge discharge voltages of the own vehicle and partner vehicle are within the scope of the charge discharge schedule, processing proceeds to S1210.

In S1180, a charge discharge history, which indicates that a charge discharge operation is performed in accordance with a schedule, is recorded, and the data included in the history is transmitted to the information center 13. Next, S1190 is performed to judge whether the charge discharge operation is completed. If the judgment result obtained in S1190 indicates that the charge discharge operation is completed, S1200 is performed to stop the charge discharge process. If, on the other hand, the obtained judgment result indicates that the charge discharge operation is not completed, processing returns to S1100.

Meanwhile, in S1210, which is performed if the charge discharge operation is outside the scope of the schedule, both the own vehicle and the partner vehicle perform a self-diagnostic check to judge whether the electric power transmission reception apparatus 12 is normally operating. If the judgment result obtained in S1210 indicates that the electric power transmission reception apparatus 12 is normally operating, processing proceeds to S1220. If, on the other hand, the obtained judgment result indicates that a certain abnormality has occurred, processing proceeds to S1310.

S1220 is performed to judge whether the charge discharge operation is excessive, namely, whether the charge discharge voltage has changed earlier than the schedule. If the judgment result obtained in S1220 indicates that the charge discharge operation is excessive, processing proceeds to S1230. In S1230, a countermeasure for solving the problem of excessive charge discharge is taken to reduce the charge discharge amount for the purpose of reducing the load imposed, for instance, on a charge discharge apparatus. More specifically, an electric power transmission reception amount is decreased by reducing the electric power transmitted from the electric power-transmitting vehicle, increasing the inter-vehicle distance between the paired vehicles, or changing the angles of the electric power transmission reception antennas 23 as needed to adjust their orientations. This makes it possible to decrease the charge discharge amount of each vehicle. If, on the other hand, the judgment result obtained in S1220 indicates that the charge discharge operation is insufficient, processing proceeds to S1240.

In S1240, the aforementioned electric power transmission reception preparation process is performed again to judge whether the problem of charge discharge insufficiency can be solved by changing the traveling style of the paired vehicles. If the judgment result obtained in S1240 indicates that the problem of charge discharge insufficiency can be solved, processing proceeds to S1250. In S1250, the charge discharge amount is increased by reducing the traveling speeds of the paired vehicles to increase the length of electric power transmission reception time or by shortening the inter-vehicle distance between the paired vehicles to increase the electromagnetic field for electric power transmission reception.

Figure 22A:
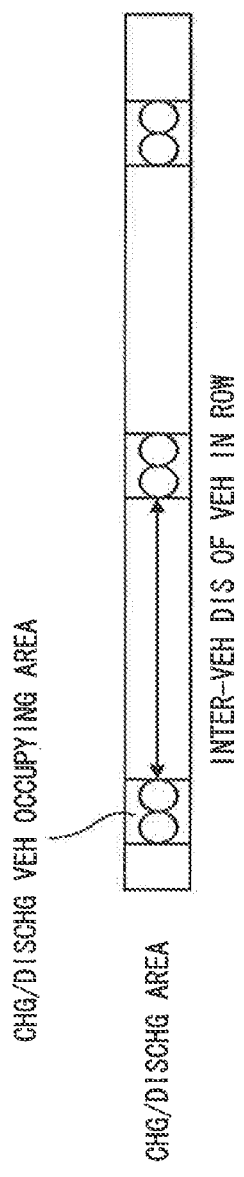
FIGS. 22A and 22B are diagrams illustrating a state in which multiple pairs of vehicles travel in a row within an electric power transmission reception area.
Figure 22B:
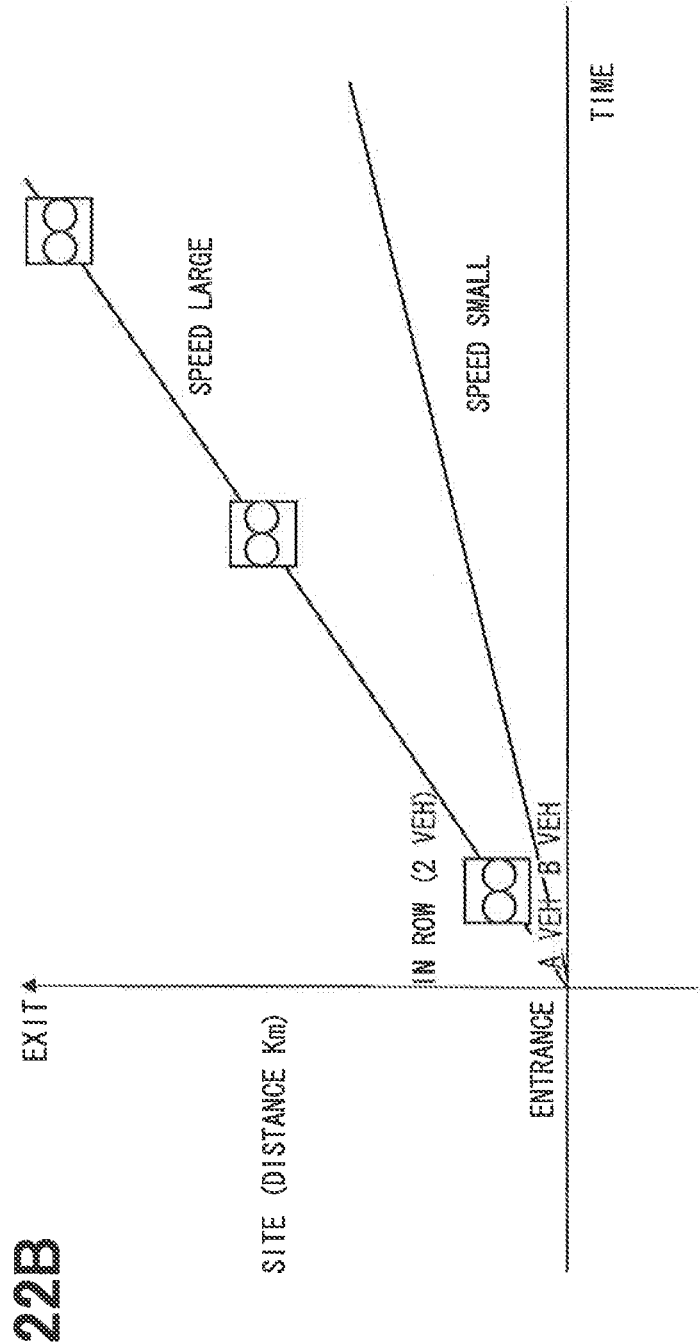

It is conceivable that two or more pairs of vehicles often travel in a row within the electric power transmission reception area as shown in FIGS. 22A and 22B. Therefore, if the traveling speeds are to be reduced, it may be preferred that they be reduced without affecting the following paired vehicles.

If, on the other hand, the judgment result obtained in S1240 does not indicate that the problem of charge discharge insufficiency can be solved by changing the traveling style of the paired vehicles, the problem of charge discharge insufficiency cannot be solved by adjusting the traveling speeds and inter-vehicle distance of the paired vehicles although the electric power transmission reception apparatus 12 of each vehicle is normally operating. In this instance, processing proceeds to S1290. In S1290, the charge discharge process is stopped.

After completion of S1230, in which the countermeasure for solving the problem of excessive charge discharge was taken, or after completion of S1250, in which the countermeasure for solving the problem of charge discharge insufficiency was taken, processing proceeds to S1260. S1260 is performed to record the charge discharge history and transmit the data included in the history to the information center 13. Next, S1270 is performed to judge whether the charge discharge operation is completed. If the judgment result obtained in S1270 indicates that the charge discharge operation is completed, S1280 is performed to stop the charge discharge process. If, on the other hand, the judgment result obtained in S1270 indicates that the charge discharge operation is not completed, processing returns to S1100.

If, in S1210, an abnormality is found in either or both of the vehicles as a result of an operational check performed on the electric power transmission reception apparatus 12 of each vehicle, processing proceeds to S1300. S1300 is performed to judge whether recovery from the abnormality can be achieved. If the judgment result obtained in S1300 indicates that recovery can be achieved, processing proceeds to S1320. In S1320, an attempt is made to recover from the abnormality. If, for example, an abnormal operation is performed by a microcomputer included in the main controller 14 for the electric power transmission reception apparatus 12 of each vehicle, the recovery from the abnormality may be achieved by resetting the microcomputer.

If, on the other hand, the judgment result obtained in S1300 does not indicate that recovery can be achieved, processing proceeds to S1310. S1310 is performed to stop the charge discharge process.

After the charge discharge process is stopped in S1200, S1280, S1290, or S1310, S1330 is performed to record a history of charge discharge completion or stop and a travel history, calculate the charge discharge amount and charge discharge efficiency, and transmit the resulting data to the information center 13.

In other words, if no abnormality is encountered, the information center 13 receives the charge discharge history, which is successively transmitted, and records the received data as a normality log. If, on the other hand, an abnormality is encountered (a deviation from the charge discharge schedule has occurred), the information center 13 receives the charge discharge history, which is successively transmitted, and records the received data as an abnormality log.

When the inter-vehicle charge discharge operation is completed, it is reported to the information center 13. In this instance, the relevant data is also transmitted to the information center 13. The data received from each vehicle is then stored in the information center 13 in association with a vehicle ID. Next, the information center 13 updates information about the user. The result of such an update is used, for instance, to calculate the fee. The result of charge discharge, the result of fee calculations, and the like are transmitted to the user's vehicles.

The display device 17 or the like displays the result of charge discharge and other items of information transmitted from the information center 13. Further, the main controller 14 updates the energy balance curve, and presents the updated energy balance curve, the available cruising distance, and other relevant information to the user. Moreover, when data such as a service account statement is received from the information center 13, the display device 17 or the like displays the received data.

Embodiments are not limited to the above examples and include various modifications and variations.

For example, in the foregoing embodiment, the paired vehicles perform an electric power transmission reception operation with respect to each other while they are traveling in a longitudinal row. Alternatively, however, vehicles arranged in a left-right direction may perform the electric power transmission reception operation by using the left-side electric power transmission reception antenna 23*c* and the right-side electric power transmission reception antenna 23*d*.

Further, in the foregoing embodiment, the paired vehicles perform the electric power transmission reception operation while they are traveling. However, if the paired vehicles have time to spare, they may perform the electric power transmission reception operation wirelessly or via wired connections while they are stopped.

Furthermore, in the foregoing embodiment, two vehicles are paired to perform an inter-vehicle electric power transmission reception operation. Alternatively, however, three or more vehicles may form a group to let one or more vehicles having extra electric power transmit electric power to one or more vehicles in need of additional electric power.

In the above foregoing embodiment, the charge discharge vehicle management database 43 and/or the electric power transmission reception area database 4 may correspond to an example of database. The main controller 40 of the information center 13 can correspond to an example of extraction device or means, and an example of information transmission device or means. The main controller 40 of the information center 13 or the main controller 14 of the electric power transmission reception apparatuses 12 mounted in vehicles 11 can correspond to an example of route calculation device or means, an example of a charge amount detection device or means, and an example of prediction device or means.

According to the present disclosure, an electric power transmission reception system can be provided in various forms. For example, the electric power transmission reception system (i) enables vehicles to communicate with an information center, (ii) pairs a charge-requesting vehicle, which is one or ones of the vehicles that has a charge request, with a discharge-requesting vehicle, which is another one or ones of the vehicles that has a discharge request, and (iii) enables the paired charge-requesting vehicle and discharge-requesting vehicle to perform electric power transmission reception therebetween. The electric power transmission reception system includes a database, an extraction device and an information transmission device. The database that is provided in the information center, which communicates with each of the vehicles to acquire information about a present location, a traveling direction, and a destination point of the each of the vehicles and information about whether the each of the vehicles has one of the charge request and the discharge request. The information center records the acquired information in the database while classifying the each of the vehicles as the charge-requesting vehicle or the discharge-requesting vehicle. The extraction device is provided in the information center to extract the charge-requesting vehicle and the discharge-requesting vehicle that are to travel in a same area at a same time as paired vehicles from the charge-requesting vehicle and the discharge-requesting vehicle recorded in the database in accordance with the information about the present location, the traveling direction, and the destination point of each of the vehicles. The information transmission device is provided in the information center to (i) generate information about an electric power transmission reception area, which is the area where the electric power transmission reception is to be performed, and information about a partner vehicle in the electric power transmission reception, and (ii) transmit the generated information to the charge-requesting vehicle and the discharge-requesting vehicle extracted by the extraction device as the paired vehicles.

According to the above electric power transmission reception system, the information center puts the information about each vehicle's present location, traveling direction, and destination into the database while classifying the each vehicle as the charge-requesting vehicle or the discharge-requesting vehicle. Therefore, a road on which each vehicle will travel can be predicted in accordance with the information put in the database. Thus, the charge-requesting vehicle and the discharge-requesting vehicle that are to travel in a same area at the same time can be extracted as the paired vehicles. As a result, the paired charge-requesting vehicle and discharge-requesting vehicle can encounter each other without significantly deviating from a proper route for the purpose of transmitting or receiving electric power.

Further, as the information about the electric power transmission reception area and the information about the paired charge-requesting vehicle or discharge-requesting vehicle are transmitted to the paired charge-requesting vehicle and discharge-requesting vehicle, both the paired charge-requesting vehicle and discharge-requesting vehicle can acquire information necessary for encountering the partner vehicle.

The above electric power transmission reception system may be configured as follows. When the information center transmits the information about the electric power transmission reception area for the electric power transmission reception and the information about the partner vehicle to the paired vehicles from the information transmission device and thereafter receives an affirmative response from both the paired vehicles, the information center confirms that the electric power transmission reception is performed in accordance with the transmitted information.

If, for instance, an own vehicle is a passenger car and a heavy vehicle is extracted as a partner vehicle for electric power transmission reception, it is difficult for a driver of the own vehicle to obtain an unobstructed front view or rear view while the own vehicle is traveling and performing a charge discharge operation relative to the heavy vehicle. Hence, the driver of the own vehicle may hope that the size of the partner vehicle is not larger than the size of the own vehicle. From such a point of view; the above electric power transmission reception system first provides the information about a desired electric power transmission reception area and partner vehicle. It may be preferred that, in response to an affirmative response from an occupant of each vehicle who has checked the provided information, the electric power transmission reception is performed in accordance with the provided information.

The above electric power transmission reception system may be configured such that: the information transmitted from the information transmission device to the charge-requesting vehicle includes a predicted charge amount; and the information transmitted from the information transmission device to the discharge-requesting vehicle includes a predicted discharge amount. According this configuration, the occupants of the charge-requesting vehicle and of the discharge-requesting vehicle can know in advance the amount of chargeable or dischargeable electric power by the electric power transmission reception and then decide whether or not to approve of the execution of the electric power transmission reception.

The above electric power transmission reception system may be configured such that: the electric power transmission reception area for the electric power transmission reception is provided as a plurality of electric power transmission reception areas for the electric power transmission reception; the plurality of electric power transmission reception areas is predetermined in association with a plurality of specific roads; and the extraction device extracts, as the paired vehicles, the charge-requesting vehicle and the discharge-requesting vehicle that are to travel at the same time in one of the plurality of predetermined electric power transmission reception areas. For instance, if the charge-requesting vehicle and the discharge-requesting vehicle transmit or receive the electric power while traveling in a row, it is conceivable that their traveling speeds are relatively low. Therefore, it may be preferred that the electric power transmission reception area be predetermined in association with a road having a dedicated electric power transmission reception lane or a specific multi-lane road for the purpose of keeping surrounding traffic unobstructed.

The above electric power transmission reception system may be configured such that: the extraction device obtains a degree of increase in the traveling distance, which is a difference between the traveling distance along an original route to the destination point and the traveling distance along another route containing one of the specific roads in the electric power transmission reception areas; and the extraction device extracts the paired vehicles from the vehicles of which the obtained degree of increase in traveling distance is smaller than a predetermined threshold value. According this configuration, it is possible to avoid a situation where the charge-requesting vehicle and the discharge-requesting vehicle are forced to significantly deviate from a route for reaching the original destination in order to transmit or receive the electric power.

The above electric power transmission reception system may further include a route calculation device, a charge amount detection device and a prediction device. The route calculation device calculates a travel route to the destination point of a certain one of the vehicles when the destination point is set in the certain one of the vehicles. The charge amount detection device detects the amount of charge in a battery mounted in the certain one of the vehicles. The prediction device predicts, in consideration of balance of the charge in the battery when the certain one of vehicles travels along the travel route calculated by the route calculation device, a change in the amount of charge in the battery with reference to the present amount of charge in the battery detected by the charge amount detection device. When the amount of charge in the battery of the certain one of the vehicles is expected to be insufficient or excessive according to the change in the amount of charge in the battery predicted by the prediction device, the certain one of the vehicles is recorded in the database as the charge-requesting vehicle or the discharge-requesting vehicle. According to this configuration, when a change in the amount of charge in the battery is predicted in accordance with a traveling route as described above, it is possible to predetermine whether individual vehicles have a charge request or a discharge request or do not need a charge nor a discharge. Therefore, the vehicles to be paired can be extracted beforehand by the information center. Consequently, the vehicles to be paired can be extracted with plenty of time to spare as compared to a case where, for example, a charge or discharge request is transmitted at a timing at which the amount of charge in the battery is smaller or larger than a predetermined value. This increases the probability of avoiding a situation where appropriate vehicles to be paired cannot be extracted.

The above electric power transmission reception system may be configured such that: the database in the information center further stores information about a requested charge amount and a requested discharge amount, which are calculated in accordance with the change in the amount of charge in the battery predicted by the prediction device; and the extraction device extracts the paired vehicles in further consideration of the requested charge amount and requested discharge amount. According to this configuration, it is possible to extract a pair of vehicles whose requested charge amount and discharge amount are closest to each other. However, the requested charge amount need not always be the same as the requested discharge amount. For example, a discharge-requesting vehicle may be extracted as the vehicle to be paired as far as it has a requested discharge amount adequate for a predetermined percentage of the requested charge amount.

The above electric power transmission reception system may be configured such that: the database in the information center further stores information about the area in which the charge-requesting vehicle is to be charged by a requested charge amount and information about the area in which the discharge-requesting vehicle is to be discharged by a requested discharge amount; and the extraction device extracts the paired vehicles in consideration of the information about the area in which the charge-requesting vehicle is to be charged by the requested charge amount and the information about the area in which the discharge-requesting vehicle is to be discharged by the requested discharge amount. According to this configuration, it is possible not only to extract a pair of vehicles that can achieve the electric power transmission reception at an appropriate timing, but also to prevent the batteries of the vehicles from being overdischarged or overcharged.

The electric power transmission reception system may be configured such that: the information transmission device transmits a charge discharge schedule in the electric power transmission reception area to at least one of the paired vehicles; and the at least one of the paired vehicles adjusts at least one of a traveling speed, an inter-vehicle distance between the paired vehicles, and an angle of an antenna for wireless electric power transmission reception to perform the electric power transmission reception between the paired vehicles in a manner to match the charge discharge schedule. According to this configuration, it is possible to ensure that electric power transmission reception takes place between the charge-requesting and discharge-requesting vehicles during their travel in the electric power transmission reception area in such a manner as to provide a charge discharge amount planned by the information center.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An electric power transmission reception system for communication between vehicle and an information center to pair a charge-requesting vehicle, which is a vehicle having a charge request, with a discharge-requesting vehicle, which is another vehicle having a discharge request, and for electric power transmission reception between the paired charge-requesting vehicle and discharge-requesting vehicle, the electric power transmission reception system comprising:

a database in the information center, wherein the information center acquires information on the charge request, the discharge request, a present location, a traveling direction, and a destination point of each vehicle by communicating with the vehicle, and records the acquired information in the database while classifying the vehicle as the charge-requesting vehicle or the discharge-requesting vehicle;

an extraction device in the information center, wherein from the charge-requesting vehicles and the discharge-requesting vehicles stored in the database, the extraction device extracts as the paired vehicles the charge-requesting vehicle and the discharge-requesting vehicle that are to travel in a same area at a same time based on the information on the present location, the traveling direction, and the destination point of each vehicle; and an information transmission device in the information center, wherein the information transmission device generates information on (i) a predetermined electric power transmission reception area, which is the area where the electric power transmission reception is to be performed, and (ii) a partner vehicle in the electric power transmission reception, wherein the information transmission device transmits the generated information to the charge-requesting vehicle and the discharge-requesting vehicle extracted as the paired vehicles by the extraction device, wherein a plurality of the predetermined electric power transmission reception areas for the electric power transmission reception is provided at a plurality of sites in association with a plurality of specific roads, wherein the extraction device extracts as the paired vehicles the charge-requesting vehicle and the discharge-requesting vehicle that are to travel at the same time in any one of the predetermined electric power transmission reception areas.

2. The electric power transmission reception system according to claim 1, wherein:

when the information transmission device of the information center receives an affirmative response from both the paired vehicles after transmitting the information on (i) the electric power transmission reception area for the electric power transmission reception and (ii) the partner vehicle to the paired vehicles, the information center confirms that the electric power transmission reception is performed in accordance with the transmitted information.

3. The electric power transmission reception system according to claim 2, wherein:

the information transmitted from the information transmission device to the charge-requesting vehicle includes a predicted charge amount; and the information transmitted from the information transmission device to the discharge-requesting vehicle includes a predicted discharge amount.

4. The electric power transmission reception system according to claim 1, wherein the extraction device extracts as the paired vehicles satisfying a condition that a traveling distance increase, which is a traveling distance difference between an original route to the destination point and another route to the destination point via the specific road of the electric power transmission reception area, is smaller than a predetermined threshold.

5. The electric power transmission reception system according to claim 1, further comprising:
   a route calculation device that calculates a travel route to the destination point of a vehicle when the destination point is set in the vehicle;
   a charge amount detection device that detects the amount of charge in a battery mounted in a vehicle; and
   a prediction device that predicts, in consideration of balance of the charge in the battery when the vehicle travels along the travel route calculated by the route calculation device, a change in the amount of charge in the battery with reference to the present amount of charge in the battery detected by the charge amount detection device, wherein:
   when the change in the amount of charge in the battery of a certain vehicle predicted by the prediction device indicates that the amount of charge in the battery is expected to be insufficient or excessive, the certain vehicle is recorded in the database as the charge-requesting vehicle or the discharge-requesting vehicle.

6. The electric power transmission reception system according to claim 5, wherein:
   the database in the information center further stores information on a requested charge amount and a requested discharge amount, which are calculated in accordance with the change in the amount of charge in the battery predicted by the prediction device; and
   the extraction device extracts the paired vehicles in further consideration of the requested charge amount and the requested discharge amount.

7. The electric power transmission reception system according to claim 6, wherein:
   the database in the information center further stores information on the area in which the charge-requesting vehicle is to be charged by the requested charge amount and information on the area in which the discharge-requesting vehicle is to be discharged by the requested discharge amount; and
   the extraction device extracts the paired vehicles in consideration of the information on the area in which the charge-requesting vehicle is to be charged by the requested charge amount and the information on the area in which the discharge-requesting vehicle is to be discharged by the requested discharge amount.

8. The electric power transmission reception system according to claim 1, wherein:
   the information transmission device transmits a charge discharge schedule in the electric power transmission reception area to at least one of the paired vehicles; and
   the at least one of the paired vehicles adjusts at least one of a traveling speed, an inter-vehicle distance between the paired vehicles, and an angle of an antenna for wireless electric power transmission reception to perform the electric power transmission reception between the paired vehicles in a manner to match the charge discharge schedule.

* * * * *